United States Patent
Oh

(10) Patent No.: US 10,567,498 B2
(45) Date of Patent: Feb. 18, 2020

(54) TERMINAL AND SERVER PERFORMING DATA SYNCHRONIZATION

(71) Applicant: Samsung Electronics Co., Ltd., Suwon-si, Gyeonggi-do (KR)

(72) Inventor: Jong Taek Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 14/417,658

(22) PCT Filed: Jul. 29, 2013

(86) PCT No.: PCT/KR2013/006792
§ 371 (c)(1),
(2) Date: Jan. 27, 2015

(87) PCT Pub. No.: WO2014/017882
PCT Pub. Date: Jan. 30, 2014

(65) Prior Publication Data
US 2015/0215399 A1 Jul. 30, 2015

(30) Foreign Application Priority Data

Jul. 27, 2012 (KR) .................. 10-2012-0082581
Jul. 29, 2013 (KR) .................. 10-2013-0089638

(51) Int. Cl.
*G06F 15/16* (2006.01)
*H04L 29/08* (2006.01)
(Continued)

(52) U.S. Cl.
CPC ........ *H04L 67/1095* (2013.01); *G06F 16/178* (2019.01); *G06F 16/1787* (2019.01); *G06F 16/951* (2019.01); *H04L 67/06* (2013.01)

(58) Field of Classification Search
CPC ................. H04L 67/1095; H04L 67/06; G06F 17/30176; G06F 17/30864
(Continued)

(56) References Cited

U.S. PATENT DOCUMENTS 7,526,575 B2 * 4/2009 Rabbers ............ G06F 17/30581
707/999.201
7,734,826 B2 6/2010 Brown et al.
(Continued)

FOREIGN PATENT DOCUMENTS

CN 1746871 A 3/2006
CN 101018309 A 8/2007
(Continued)

*Primary Examiner* — Anthony Mejia
(74) *Attorney, Agent, or Firm* — Jefferson IP Law, LLP

(57) ABSTRACT

Disclosed is a terminal performing data synchronization with a server or another terminal. The terminal is capable of synchronizing at least one type of preset file with a server connected through a network. The terminal can comprise: a management unit which manages first synchronization information for identifying the at least one type of file among multiple files stored in the terminal; a transmitting and receiving unit which receives second synchronization information for identifying the at least one type of file stored in the server when the transmitting and receiving unit is connected through the server and the network; and a determination unit which determines whether synchronization is required between the terminal and the server by comparing the first synchronization information and the second synchronization information.

24 Claims, 36 Drawing Sheets

(51) Int. Cl.
*G06F 16/951* (2019.01)
*G06F 16/178* (2019.01)

(58) Field of Classification Search
USPC .......................................................... 709/219
See application file for complete search history.

(56) References Cited

U.S. PATENT DOCUMENTS

| | | | | |
|---|---|---|---|---|
| 7,962,575 B2* | 6/2011 | Glatt | ................... | H04L 67/1095 709/219 |
| 8,213,332 B2* | 7/2012 | Prasad | ................... | G06F 16/178 370/252 |
| 8,229,888 B1* | 7/2012 | Roskind | ........... | H04N 21/25808 707/611 |
| 8,332,357 B1* | 12/2012 | Chung | ................... | G06F 16/178 707/634 |
| 8,572,028 B2* | 10/2013 | Witriol | ................ | H04L 67/1095 707/610 |
| 9,141,483 B1 | 9/2015 | Sekar | ................... | G06F 11/1662 |
| 2001/0038032 A1* | 11/2001 | Kang | ....................... | G06F 3/062 235/375 |
| 2003/0191827 A1* | 10/2003 | Piispanen | .............. | G06F 16/275 709/221 |
| 2006/0112150 A1* | 5/2006 | Brown | ............... | G06F 17/30176 |
| 2007/0067349 A1* | 3/2007 | Jhaveri | ................ | G06F 21/6218 |
| 2007/0076102 A1* | 4/2007 | Date | ..................... | G11B 27/105 348/231.99 |
| 2007/0097430 A1* | 5/2007 | Kitamaru | ............. | G06F 17/3028 358/1.15 |
| 2008/0155058 A1* | 6/2008 | Prasad | ................. | H04L 67/1095 709/218 |
| 2009/0063660 A1* | 3/2009 | Fleischman | ............. | G11B 27/10 709/219 |
| 2009/0216815 A1* | 8/2009 | Braginsky | .......... | G06F 17/30176 |
| 2009/0271447 A1* | 10/2009 | Shin | ................... | G06F 17/30194 |
| 2010/0138387 A1* | 6/2010 | Simelius | ............ | G06F 17/30174 707/624 |
| 2012/0317077 A1* | 12/2012 | Chung | .............. | G06F 17/30174 707/634 |
| 2013/0124612 A1* | 5/2013 | Braginsky | .......... | G06F 17/30176 709/203 |
| 2014/0047560 A1* | 2/2014 | Meyer | ..................... | G06F 21/62 726/28 |
| 2014/0337284 A1* | 11/2014 | Orth | ......................... | G06F 16/16 707/610 |
| 2015/0135300 A1* | 5/2015 | Ford | ........................ | G06F 16/93 726/11 |
| 2016/0019233 A1* | 1/2016 | Wijayaratne | .......... | G06F 16/178 707/625 |
| 2016/0196274 A1* | 7/2016 | Gadde | ..................... | G06F 16/13 707/626 |
| 2017/0308443 A1* | 10/2017 | Lai | ....................... | G06F 16/2255 |

FOREIGN PATENT DOCUMENTS

| | | |
|---|---|---|
| CN | 102495866 A | 6/2012 |
| KR | 10-2008-0107339 A | 12/2008 |
| KR | 10-2009-0096553 A | 9/2009 |
| KR | 10-2010-0062104 A | 6/2010 |
| KR | 10-2010-0067976 A | 6/2010 |

\* cited by examiner

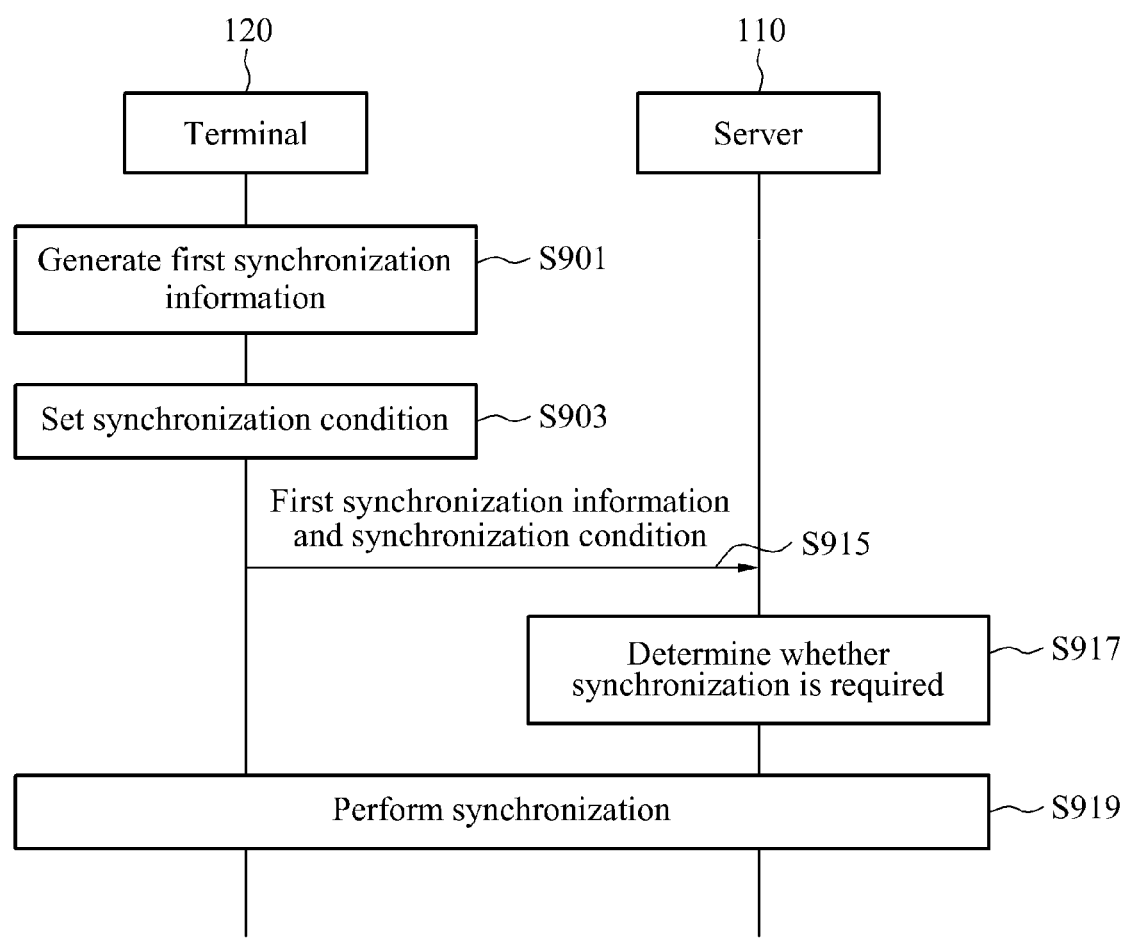

FIG. 10A

| file name | meta information | | | |
|---|---|---|---|---|
| | extension | date | place | device-info |
| picture 1 | JPG | 2013. 7. 10 | Seoul | device #1 |
| picture 2 | JPG | 2013. 7. 10 | Seoul | device #1 |
| picture 3 | JPG | 2013. 8. 11 | Busan | device #2 |
| e-mail 1 | eml | 2013. 7. 10 | Seoul | device #2 |
| e-mail 2 | eml | 2013. 8. 11 | Busan | device #2 |
| word 1 | doc | 2013. 7. 10 | Seoul | device #1 |
| word 2 | doc | 2013. 8. 11 | Seoul | device #2 |

FIG. 10B

| file name | meta information | | | |
|---|---|---|---|---|
| | extension | date | place | device-info |
| picture 1 | JPG | 2013. 7. 10 | Seoul | device #1 |
| picture 2 | JPG | 2013. 7. 10 | Seoul | device #1 |
| picture 3 | JPG | 2013. 8. 11 | Busan | device #2 |
| e-mail 1 | eml | 2013. 7. 10 | Seoul | device #2 |
| e-mail 2 | eml | 2013. 8. 11 | Busan | device #2 |
| word 1 | doc | 2013. 7. 10 | Seoul | device #1 |
| word 2 | doc | 2013. 8. 11 | Seoul | device #2 |
| picture 4 | JPG | 2013. 7. 10 | Seoul | device #3 |
| e-mail 3 | eml | 2013. 8. 11 | Busan | device #1 |
| word 3 | doc | 2013. 8. 11 | Busan | device #1 |

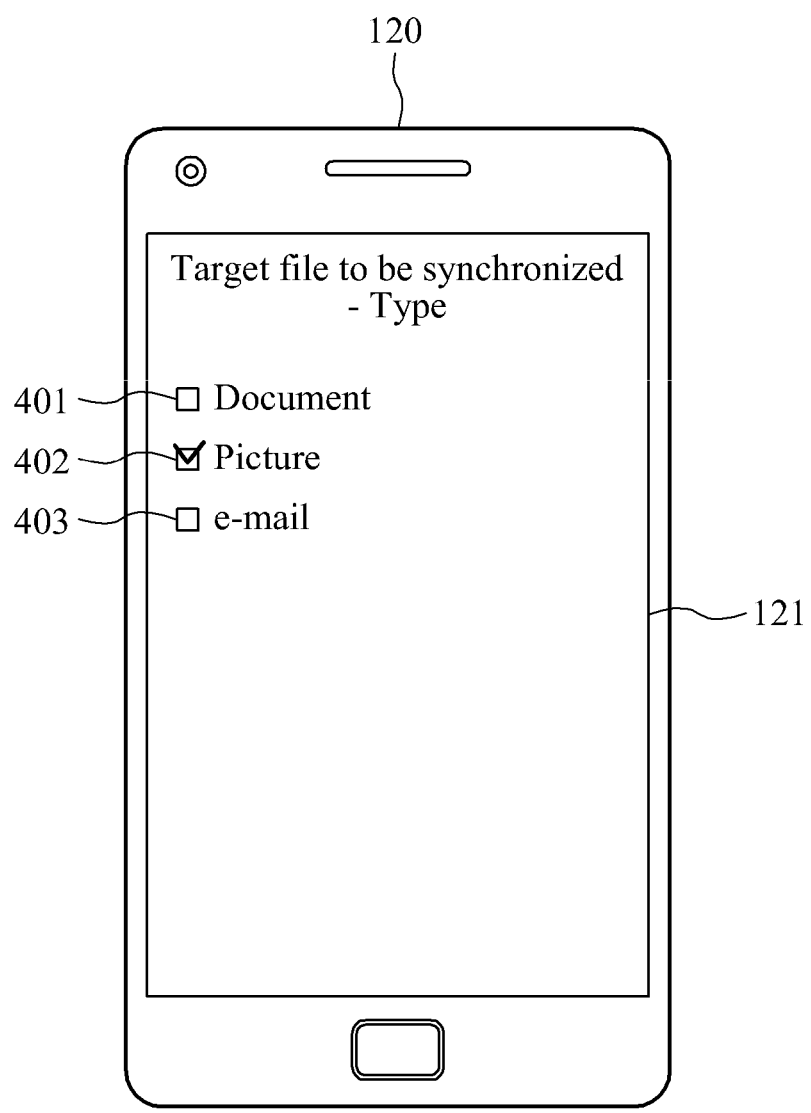

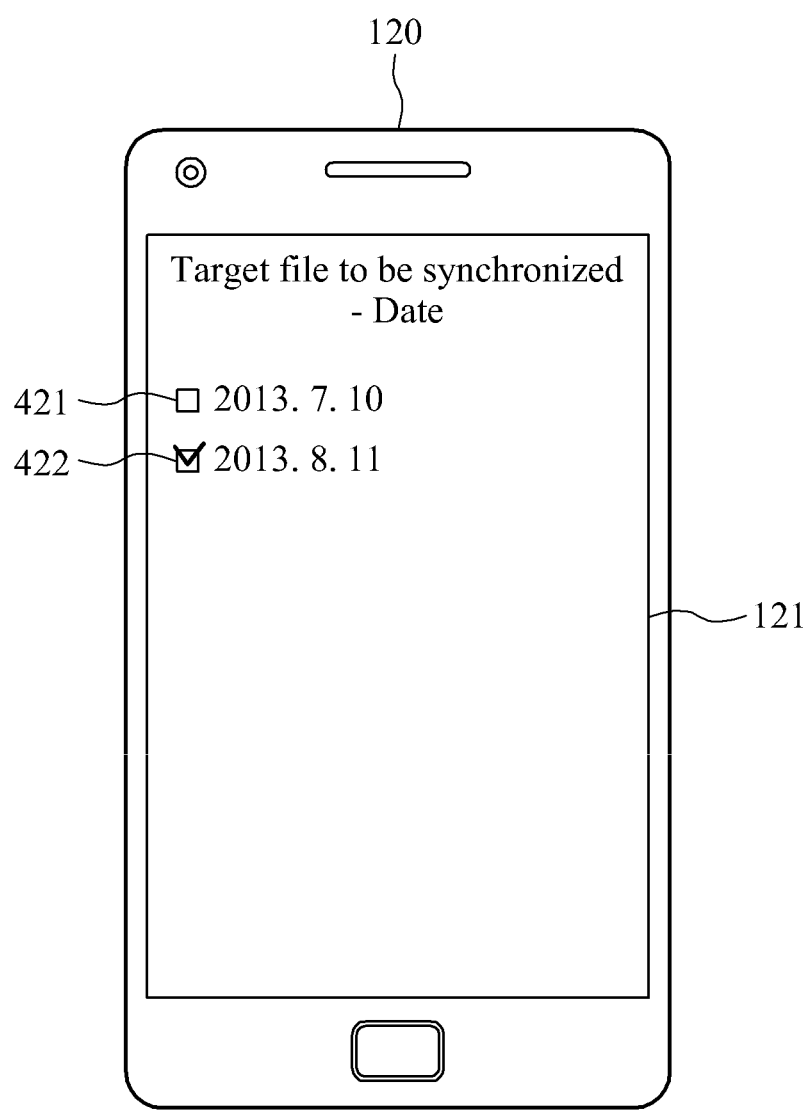

FIG. 13B

| file name | meta information | | | |
|---|---|---|---|---|
| | extension | date | place | device-info |
| picture 1 | JPG | 2013. 7. 10 | Seoul | device #1 |
| picture 2 | JPG | 2013. 7. 10 | Seoul | device #1 |
| picture 3 | JPG | 2013. 8. 11 | Busan | device #2 |
| e-mail 1 | eml | 2013. 7. 10 | Seoul | device #2 |
| e-mail 2 | eml | 2013. 8. 11 | Busan | device #2 |
| word 1 | doc | 2013. 7. 10 | Seoul | device #1 |
| word 2 | doc | 2013. 8. 11 | Seoul | device #2 |
| picture 4 | JPG | 2013. 7. 10 | Seoul | device #3 |

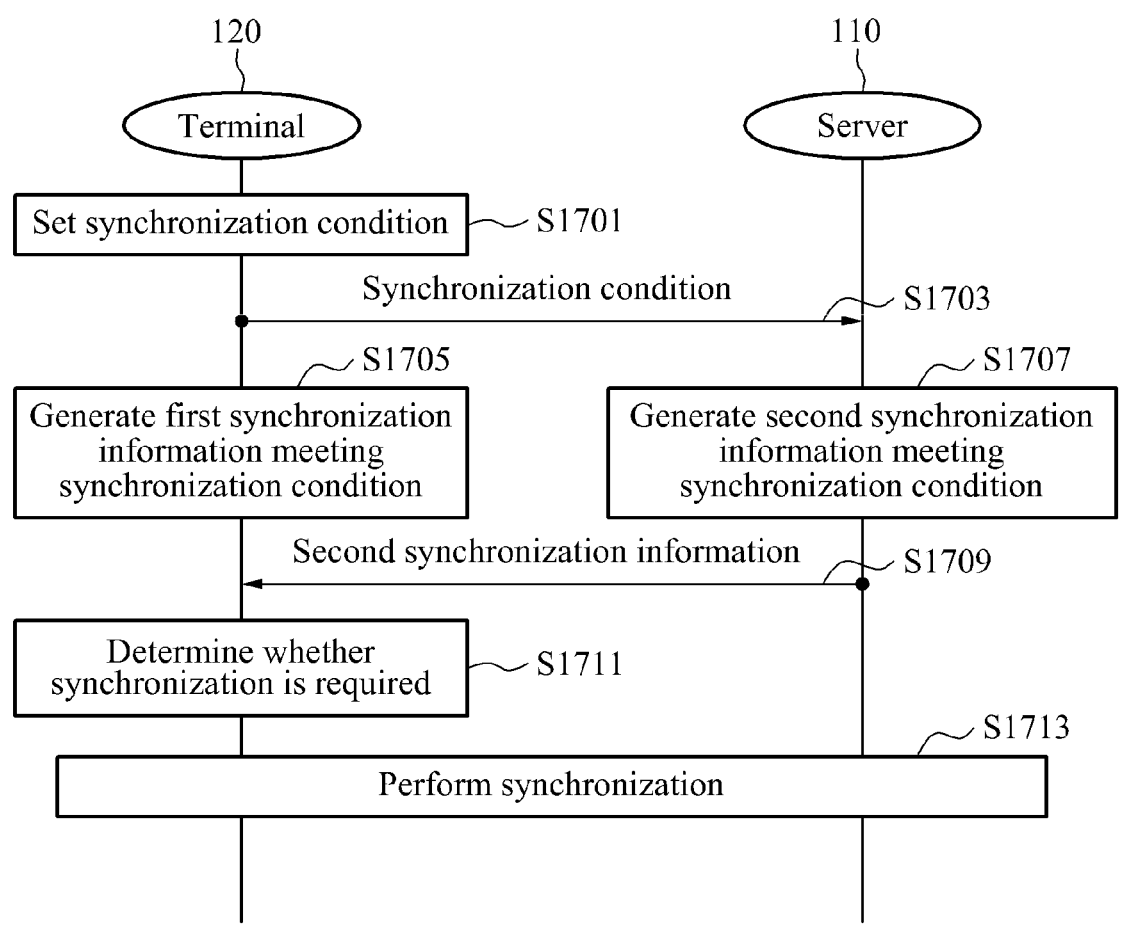

FIG. 18A

| file name | meta information | | | |
|---|---|---|---|---|
| | extension | date | place | device-info |
| picture 1 | JPG | 2013. 7. 10 | Seoul | device #1 |
| picture 2 | JPG | 2013. 7. 10 | Seoul | device #1 |
| picture 3 | JPG | 2013. 8. 11 | Busan | device #2 |
| e-mail 1 | eml | 2013. 7. 10 | Seoul | device #2 |
| e-mail 2 | eml | 2013. 8. 11 | Busan | device #2 |
| word 1 | doc | 2013. 7. 10 | Seoul | device #1 |
| word 2 | doc | 2013. 8. 11 | Seoul | device #2 |

FIG. 18B

| file name | meta information | | | |
|---|---|---|---|---|
| | extension | date | place | device-info |
| picture 1 | JPG | 2013. 7. 10 | Seoul | device #1 |
| picture 2 | JPG | 2013. 7. 10 | Seoul | device #1 |
| picture 3 | JPG | 2013. 8. 11 | Busan | device #2 |

1001, 1011, 1012, 1010, 1013, 1014

1021 — picture 1
1022 — picture 2
1023 — picture 3

FIG. 18C

| file name | meta information | | | |
|---|---|---|---|---|
| | extension | date | place | device-info |
| picture 1 | JPG | 2013. 7. 10 | Seoul | device #1 |
| picture 2 | JPG | 2013. 7. 10 | Seoul | device #1 |
| e-mail 1 | eml | 2013. 7. 10 | Seoul | device #2 |
| word 1 | doc | 2013. 7. 10 | Seoul | device #1 |

1001 — file name
1010 — meta information
1021 — picture 1
1022 — picture 2
1024 — e-mail 1
1026 — word 1

TERMINAL AND SERVER PERFORMING DATA SYNCHRONIZATION

CROSS-REFERENCE TO RELATED APPLICATION(S)

This application is a U.S. National Stage application under 35 U.S.C. § 371 of an International application filed on Jul. 29, 2013 and assigned application number PCT/KR2013/006792, which claimed the benefit of a Korean patent application filed on Jul. 27, 2012 in the Korean Intellectual Property Office and assigned Serial number 10-2012-0082581, and a Korean patent application filed on Jul. 29, 2013 in the Korean Intellectual Property Office and assigned Serial number 10-2013-0089638, the entire disclosures of each of which are hereby incorporated by reference.

TECHNICAL FIELD

The following description relates to a terminal and a server for performing data synchronization, and more particularly, to a terminal and a server that may be connected to each other through a network so that a data file stored in a terminal among a plurality of terminals of a user may be automatically synchronized between the terminal and another terminal, using a webhard server.

BACKGROUND ART

Recently, services of automatically synchronizing data stored in a plurality of terminals have been provided. The above services may include, for example, U-cloud services of Internet service providers, or Apple's iCloud service. Generally, in the above services, a specific target folder to be synchronized by a user or an application program may be set in advance, and only a data file in the specific target folder may be synchronized between terminals of users.

With extension of cloud services, there is a desire for a wider variety of schemes of synchronizing all files in a specific folder, as well as a file selected by a user, or of storing and managing the synchronized files based on a specific criterion set by the user.

DISCLOSURE OF INVENTION

In one general aspect, there is provided a terminal for synchronizing at least one preset type of files with a server connected through a network, the terminal including a management unit to manage first synchronization information used to identify the at least one type of files among a plurality of files stored in the terminal, a transmitting and receiving unit to receive, from the server, second synchronization information used to identify the at least one type of files stored in the server when the terminal is connected to the server through the network, and a determination unit to determine whether synchronization between the terminal and the server is required by comparing the first synchronization information to the second synchronization information.

When a first file among the plurality of files is synchronized based on the determining, a folder of the terminal in which the first file is stored may be set to differ from a folder of the server in which the first file is stored.

The terminal may store and manage the first file in a preset folder, based on meta information of the first file.

In another general aspect, there is provided a terminal for synchronizing at least one preset type of files with a server connected through a network, the terminal including a management unit to manage first synchronization information used to identify the at least one type of files among a plurality of files stored in the terminal, a transmitting and receiving unit to transmit the first synchronization information to the server, when the terminal is connected to the server through the network, and a processing unit to perform synchronization between the terminal and the server based on determining, by the server, whether the synchronization is required.

When a first file among the plurality of files is synchronized based on the determining, a folder of the terminal in which the first file is stored may be set to differ from a folder of the server in which the first file is stored.

In another general aspect, there is provided a server including a management unit to generate second synchronization information including identification information and meta information of at least one file stored in a server, a transmitting and receiving unit to receive, from a terminal, first synchronization information including identification information and meta information of a file stored in the terminal, and a determination unit to determine a target file that is to be synchronized, by comparing meta information meeting a preset synchronization condition between the first synchronization information and the second synchronization information.

In another general aspect, there is provided a data synchronization method by which a terminal synchronizes at least one preset type of files with a server connected through a network, the data synchronization method including managing first synchronization information used to identify the at least one type of files among a plurality of files stored in the terminal, receiving, from the server, second synchronization information used to identify the at least one type of files stored in the server when the terminal is connected to the server through the network, and determining whether synchronization between the terminal and the server is required by comparing the first synchronization information and the second synchronization information.

When a first file among the plurality of files is synchronized based on the determining, a folder of the terminal in which the first file is stored may be set to differ from a folder of the server in which the first file is stored.

In another general aspect, there is provided a data synchronization method by which a terminal synchronizes at least one preset type of files with a server connected through a network, the data synchronization method including managing first synchronization information used to identify the at least one type of files among a plurality of files stored in the terminal, transmitting the first synchronization information to the server, when the terminal is connected to the server through the network, and performing synchronization between the terminal and the server, based on determining, by the server, whether the synchronization is required.

In another general aspect, there is provided a data synchronization method by which a server synchronizes at least one preset type of files with a terminal connected through a network, the data synchronization method including receiving first synchronization information used to identify the at least one type of files stored in the terminal when the server is connected to the terminal through the network, managing second synchronization information used to identify the at least one type of files among a plurality of files stored in the server, and comparing the first synchronization information and the second synchronization information, determining whether synchronization between the terminal and the server is required, and performing the synchronization based on the determining.

In another general aspect, there is provided a terminal for performing synchronization with a server connected through a network, the terminal including a management unit to generate first synchronization information including identification information and meta information of at least one file stored in the terminal, a transmitting and receiving unit to receive, from the server, second synchronization information including identification information and meta information of a file stored in the server, and a determination unit to determine a target file that is to be synchronized, by comparing meta information meeting a preset synchronization condition between the first synchronization information and the second synchronization information.

In another general aspect, there is provided a synchronization method by which a terminal performs synchronization with a server connected through a network, the synchronization method including generating first synchronization information including identification information and meta information of at least one file stored in the terminal, receiving, from the server, second synchronization information including identification information and meta information of a file stored in the server, and determining a target file that is to be synchronized, by comparing meta information meeting a preset synchronization condition between the first synchronization information and the second synchronization information.

In another general aspect, there is provided a server including a management unit to generate second synchronization information including identification information and meta information of at least one file stored in a server, a transmitting and receiving unit to receive, from a terminal, first synchronization information including identification information and meta information of a file stored in the terminal, and a determination unit to determine a target file that is to be synchronized, by comparing meta information meeting a preset synchronization condition between the first synchronization information and the second synchronization information.

In another general aspect, there is provided a synchronization method by which a server performs synchronization with a terminal connected through a network, the synchronization method including generating second synchronization information including identification information and meta information of at least one file stored in the server; receiving, from the terminal, first synchronization information including identification information and meta information of a file stored in the terminal; and determining a target file that is to be synchronized, by comparing meta information meeting a preset synchronization condition between the first synchronization information and the second synchronization information.

BRIEF DESCRIPTION OF THE DRAWINGS

FIGS. 9A through 9D are flowcharts illustrating examples of operations of a server and a terminal according to an embodiment.

FIGS. 10A and 10B illustrate an example of first synchronization information and an example of second synchronization information, respectively, according to an embodiment.

FIGS. 11A through 11G illustrate various examples of a terminal according to an embodiment.

FIG. 13B illustrates an example of first synchronization information according to an embodiment.

FIG. 17 is a flowchart illustrating a synchronization process according to an embodiment.

FIGS. 18A through 18C illustrate examples of synchronization information according to an embodiment.

BEST MODE FOR CARRYING OUT THE INVENTION

Figure 1A:
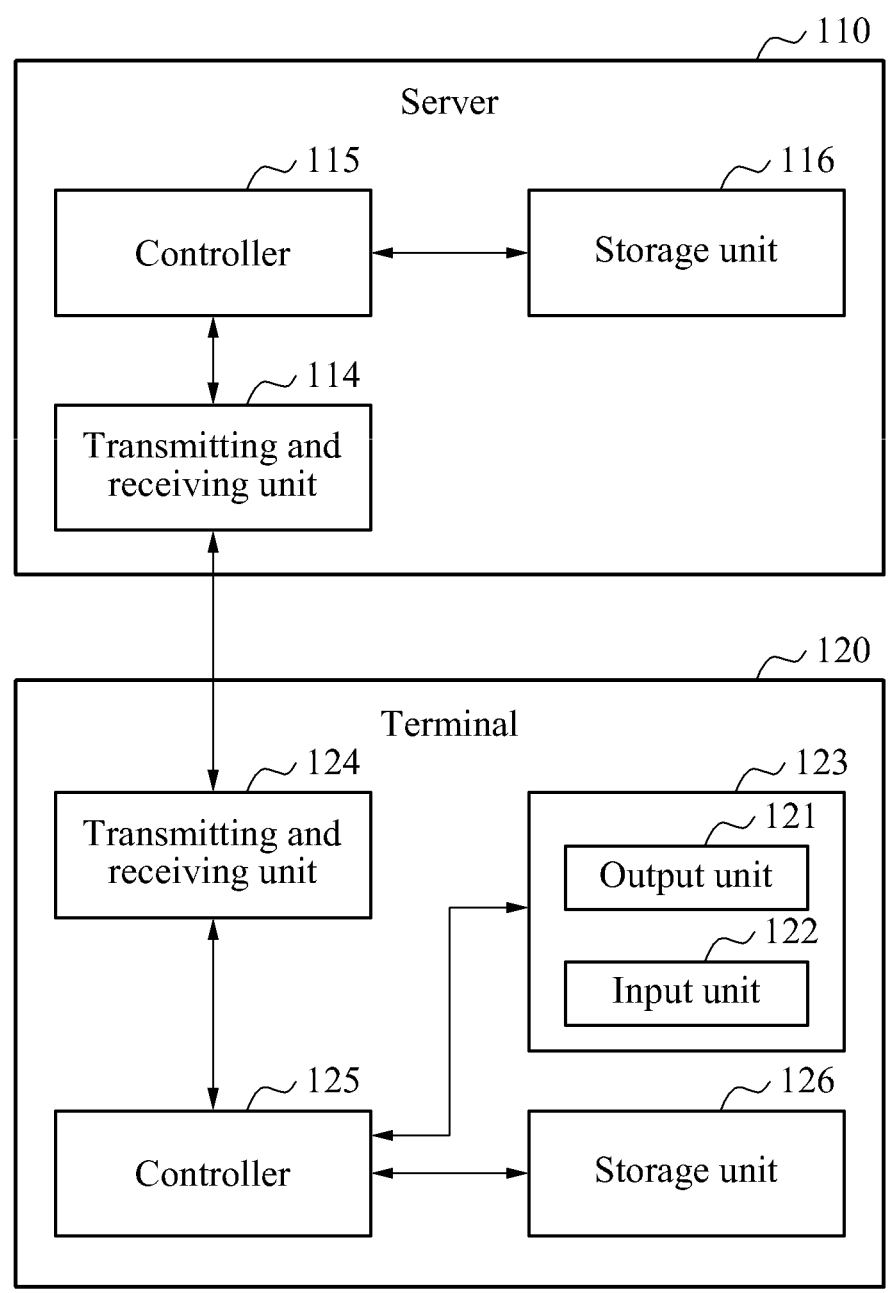
FIG. 1A is a block diagram illustrating an example of a server and a terminal according to an embodiment.

Hereinafter, some embodiments will be described in detail with reference to the accompanying drawings. The inventive concept, however, should not be construed as limited to the embodiments set forth herein. Like reference numerals in the drawings refer to like elements throughout the present disclosure.

The terms used herein are mainly selected from general terms currently being used in light of functions in the present disclosure. Yet, the meanings of the terms used herein may be changed to keep up with the intent of an operator in the art, a custom, or the appearance of new technologies.

In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

First synchronization information may refer to a list of files corresponding to at least one preset file type among at least one file stored in a terminal. For example, when a file corresponds to the at least one type, based on a file extension included in meta information of the file, the file may be written to be included in a first synchronization list. In this example, the first synchronization information may be referred to as a first synchronization list.

In another example, the first synchronization information may include meta information and an identifier of each of the at least one file stored in the terminal.

Second synchronization information may refer to a list of files corresponding to the at least one type among at least one file stored in a server. Similarly to the first synchronization list, when a second corresponds to the at least one file type, based on a file extension included in meta information of the file, the file may be written to be included in a second synchronization list. In this example, the second synchronization information may be referred to as a second synchronization list.

In another example, the second synchronization information may include meta information and an identifier of each of the at least one file stored in the server.

Additionally, a first file may refer to a file classified as a target file to be synchronized, among files included in the first synchronization list and the second synchronization list, based on whether file synchronization is required.

FIG. 1A is a block diagram illustrating an example of a server and a terminal according to an embodiment. Referring to FIG. 1A, a server 110 may include a first transmitting and receiving unit 114, a first controller 115, and a firs storage unit 116. In addition, a terminal 120 may include an output unit 121, an input unit 122, a second transmitting and receiving unit 124, a second controller 125, and a second storage unit 126. The terms "first" and "second" are used to indicate elements of the server 110 and elements of the terminal 120, respectively.

The first transmitting and receiving unit 114 or the second transmitting and receiving unit 124 may include at least one of a mobile communication module, a sub-communication module, and a connector for a cable connection.

The mobile communication module may allow the server 110 or the terminal 120 to be connected to an external apparatus through a mobile communication, using at least one antenna, based on a control of the first controller 115 or the second controller 125. The mobile communication module may transmit and/or receive a wireless signal for a voice call, a video call, a Short Message Service (SMS), or a Multimedia Messaging Service (MMS) to and/or from a mobile phone (not shown), a smartphone (not shown), a tablet Personal Computer (PC), or another apparatus (not shown) with telephone numbers to be input to the server 110 or the terminal 120.

The sub-communication module may include at least one of a Wireless Local Area Network (WLAN) module and a Near Field Communication (NFC) module.

The first controller 115 or the second controller 125 may include a Central Processing Unit (CPU), a Read Only Memory (ROM) in which a control program is stored, and a Random Access Memory (RAM) that is used to recall data or a signal received from an external source or used as a memory area for a job to be performed. The CPU, the ROM and the RAM may be connected to each other through an internal bus.

The firs storage unit 116 or the second storage unit 126 may store at least one file. Also, the firs storage unit 116 or the second storage unit 126 may store an application and a control program to control the server 110 or the terminal 120.

The firs storage unit 116 or the second storage unit 126 may include a ROM, a RAM, or a memory card (not shown). The memory card may be, for example, a Secure Digital (SD) card, or a memory stick. A storage unit may include a nonvolatile memory, a volatile memory, a Hard Disk Drive (HDD), or a Solid-State Drive (SSD).

The output unit 121 may output a processing result of the terminal 120. The input unit 122 may allow a user command to be input. The output unit 121 and the input unit 122 may be implemented in the same hardware, for example, a touch screen 123.

Figure 1B:
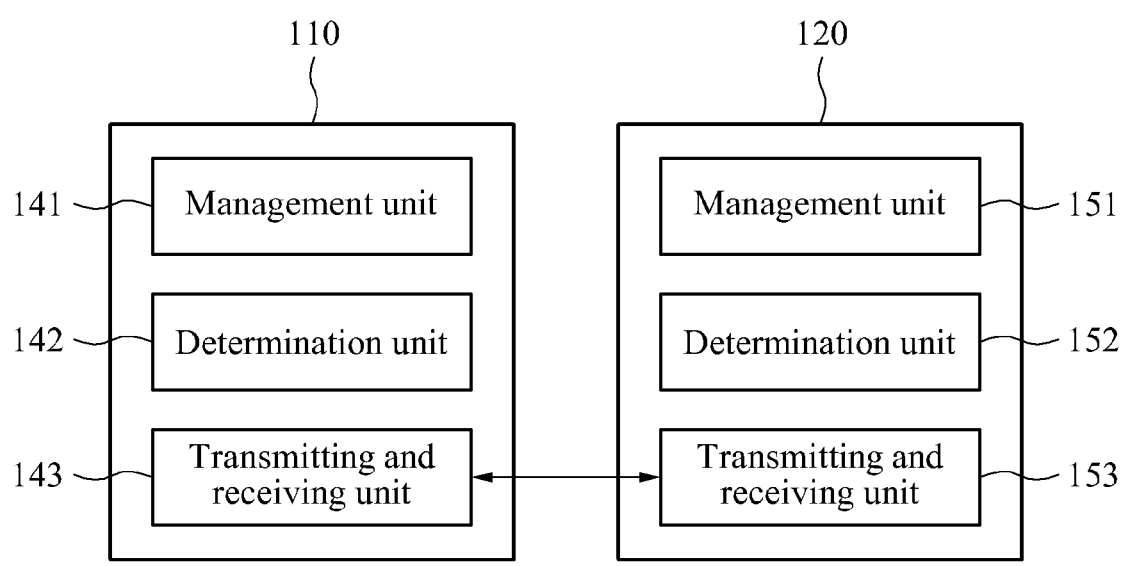
FIG. 1B is a block diagram illustrating another example of a server and a terminal according to an embodiment.

FIG. 1B is a block diagram illustrating another example of a server and a terminal according to an embodiment.

Referring to FIG. 1B, the server 110 may include a first management unit 141, a first determination unit 142, and a first receiving unit 143. The terminal 120 may include a second management unit 151, a second determination unit 152, and a second receiving unit 153. The terms "first" and "second" are used to indicate elements of the server 110 and elements of the terminal 120, respectively.

In the FIG. 1B, the server 110 and the terminal 120 may be connected through a network. In an example, the first transmitting and receiving unit 143 and the second transmitting and receiving unit 153 may be connected through the network. In another example, the first transmitting and receiving unit 143 and the second transmitting and receiving unit 153 may perform direct communication, based on a preset communication scheme. In this example, the server 110 and the terminal 120 may be connected in D2D.

The first management unit 141 may generate second synchronization information including at least one meta information and identification information of at least one file stored in the server 110. The first management unit 141 may generate, for example, second synchronization information of FIG. 10B. The server 110 may generate or update the second synchronization information, based on synchronization with at least one terminal 120 connected to the server 110. For example, the server 110 may include at least one first file. The server 110 may generate second synchronization information including an identifier of the first file and at least one meta information indicating an attribute of the first file. The server 110 may perform synchronization with the terminal 120, may change the at least one first file to at least one second file, and may store the second file. The server 110 may update the second synchronization information to include an identifier of each of the at least one second file and at least one meta information indicating an attribute of each of the at least one the second file. In other words, the server 110 may generate the second synchronization information, and may manage the generated second synchronization information.

The first determination unit 142 may compare meta information meeting a preset synchronization condition between first synchronization information and the second synchronization information, and may determine a target file that is to be synchronized. The first synchronization information may be received from the terminal 120.

As described above, the server 110 may determine the target file. In another example, the terminal 120 may determine the target file.

The second management unit 151 may generate first synchronization information including at least one meta information and identification information of at least one file stored in the terminal 120. The second management unit 151 may generate, for example, first synchronization information of FIG. 10A. Additionally, the second management unit 151 may update the first synchronization information. In an example, the terminal 120 may create a new file. The second management unit 151 may perform updating so that an identifier of the new file and meta information indicating an attribute of the new file may be added to the first synchronization information. In another example, the terminal 120 may delete an existing file. The second management unit 151 may perform updating so that an identifier of the deleted file and meta information indicating an attribute of the deleted file may be removed from the first synchronization information. In still another example, the terminal 120 may change the existing file. The second management unit 151 may perform updating so that meta information and an identifier of the changed file may be modified in the first synchronization information.

The second transmitting and receiving unit 153 may receive, from the first transmitting and receiving unit 143, the second synchronization information including meta information and identification information of a file stored in the server.

Although not shown in the drawings, each of the server 110 and the terminal 120 may further include a processing unit to process synchronization.

The second determination unit 152 may compare meta information meeting a preset synchronization condition between the first synchronization information and the second synchronization information, and may determine a target file that is to be synchronized. The preset synchronization condition may be set to be at least one item of the meta information, which will be further described.

Figure 2:
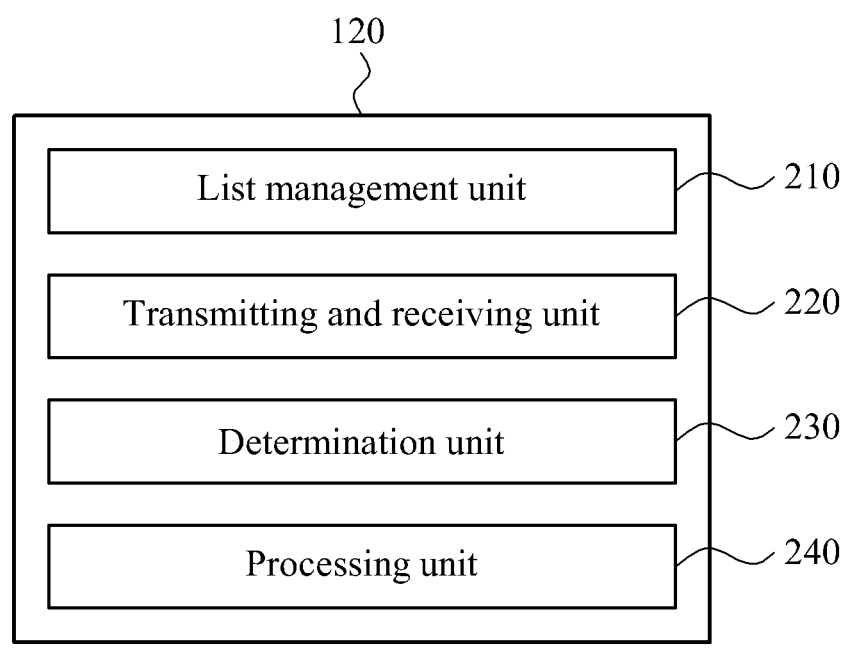
FIG. 2 is a block diagram illustrating a terminal according to an embodiment.

FIG. 2 is a block diagram illustrating a configuration of the terminal 120 according to an embodiment.

The terminal 120 may synchronize at least one preset type of files with the server 110 connected through a network. The terminal 120 may include a list management unit 210, a transmitting and receiving unit 220, a determination unit 230, and a processing unit 240.

The list management unit 210 may manage a first synchronization list used to identify at least one type of files among a plurality of files stored in the terminal 120.

The first synchronization list may include at least one file meeting a synchronization condition set in advance by a user, among the files stored in the terminal 120. The user may set at least one file type or a file extension as the synchronization condition.

The transmitting and receiving unit 220 may receive a second synchronization list from the server 110, or may transmit the first synchronization list to the server 110, when the terminal 120 is connected to the server 110 through the network. The second synchronization list may be used to identify the at least one type of files stored in the server 110.

For example, when the terminal 120 determines whether each of files corresponding to a type of a target file set to be synchronized by the user is required to be synchronized, the transmitting and receiving unit 220 may receive, from the server 110, a second synchronization list used to identify at least one type of files set by the user.

The second synchronization list may include at least one file meeting a synchronization condition set in advance by the user, among files stored in the server 110. The user may set at least one file type or a file extension as the synchronization condition.

When the server 110 determines whether synchronization is required, the transmitting and receiving unit 220 may transmit, to the server 110, the first synchronization list used to identify at least one type of files set by the user among the files stored in the terminal 120.

When the terminal 120 determines whether synchronization of each file is required, the determination unit 230 may compare the first synchronization list to the second synchronization list, and may determine whether synchronization between the terminal 120 and the server 110 is required.

The determination unit 230 may compare the first synchronization list for at least one type of files meeting a synchronization condition set by the user among the files stored in the terminal 120 to the second synchronization list for at least one type of files meeting the synchronization condition among the files stored in the server 110, and may determine whether each of the files included in the first synchronization list and the second synchronization list is required to be synchronized.

The processing unit 240 may perform synchronization of a first file among the plurality of files between the server 110 and the terminal 120, based on whether the synchronization is required.

The first file may refer to at least one file classified as a target file to be synchronized, based on determining, by the determination unit 230 or the server 110, whether synchronization of each file is required.

To process synchronization between the server 110 and the terminal 120, the processing unit 240 may receive a file that is not stored in a corresponding device from a counterpart device, and may transmit a file that is not stored in the counterpart device, based on an analysis result obtained by comparing the first synchronization list to the second synchronization list.

For example, when synchronization of the first file is applied, a folder of the terminal 120 in which the first file is stored, and a folder of the server 110 in which the first file is stored may be set to differ from each other.

In this example, the terminal 120 and the server 110 may store and manage the first file in the folder of the terminal 120 and the folder of the server 110, respectively, based on meta information of the first file. The folders may be set in advance by the user.

The meta information of the first file may include at least one of a creation time, a change time, location information on a location in which the first file is created or changed, terminal information on a terminal that creates or changes the first file, user information, and content summary information, in association with the first file.

Additionally, the folders may be created in the terminal 120 and the server 110 differently based on at least one of the creation time, the change time, the location information, the terminal information, and the user information.

Figure 3:
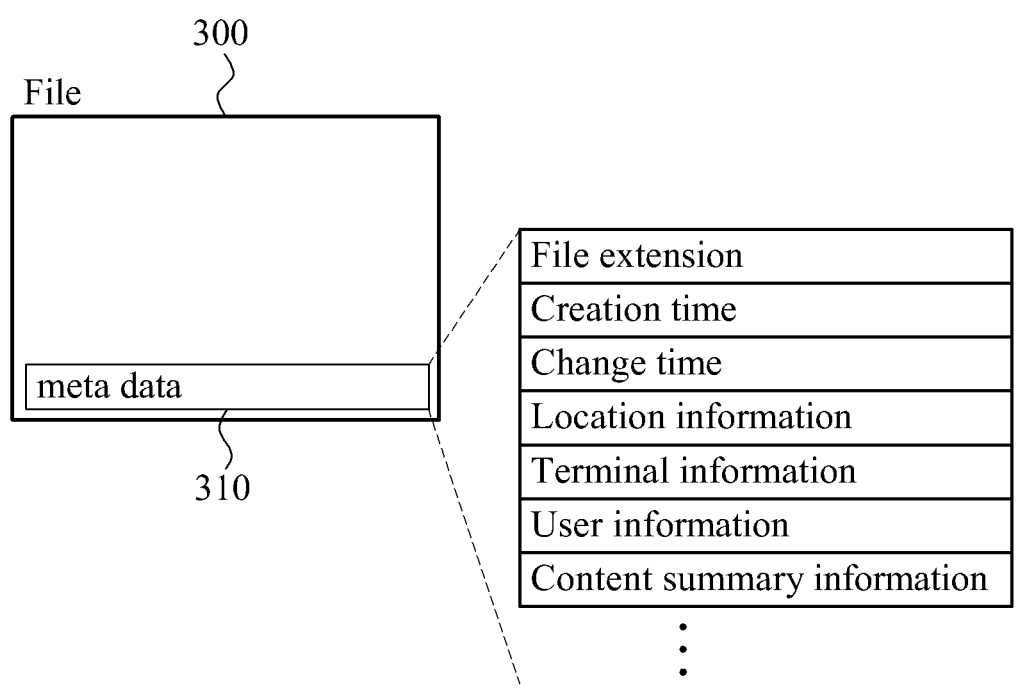
FIG. 3 illustrates meta information of each file, and details included in the meta information according to an embodiment.

FIG. 3 illustrates meta information of each file, and details included in the meta information according to an embodiment.

A file 300 stored in each of the server 110 and the terminal 120 may include unique meta information 310.

Referring to FIG. 3, the meta information 310 may include at least one of a file extension name, a creation time, a change time, location information, terminal information, user information, and content summary information.

The server 110 or the terminal 120 may identify at least one preset type of files, based on the meta information 310.

Additionally, the meta information 310 may be used to specify a folder of the server 110 or the terminal 120 in which a synchronized file is stored.

For example, a storage folder may be created based on at least one item in the meta information 310 of a first file determined to need to be synchronized among files stored in the server 110 and the terminal 120, and the first file may be stored and managed in the storage folder. Different storage folders in which the first file is stored may be set in the server 110 and the terminal 120.

Figure 4:
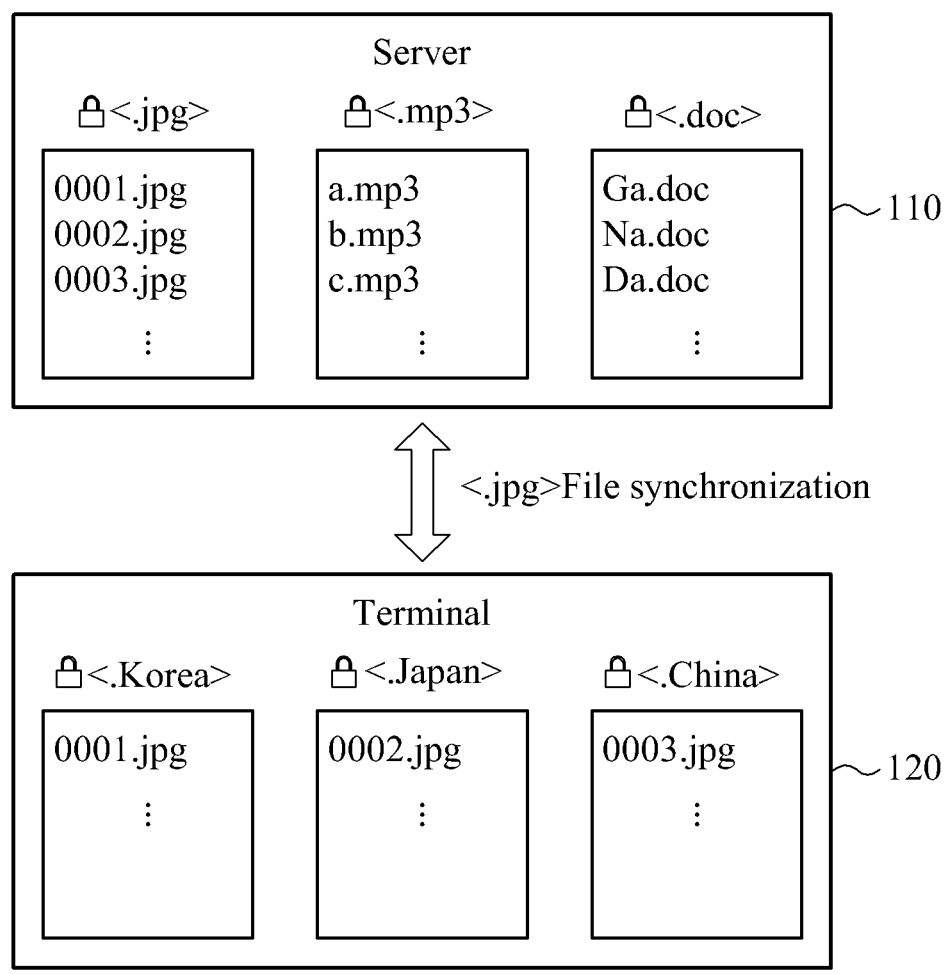
FIG. 4 illustrates an example in which synchronized files are stored in a server and a terminal based on different criteria, during data synchronization between the server and the terminal according to an embodiment.

FIG. 4 illustrates an example in which synchronized files are stored in the server 110 and the terminal 120 based on different criteria, during data synchronization between the server 110 and the terminal 120.

Referring to FIG. 4, the server 110 may sort files into folders, for example, JPG, MP3, and DOC, based on a file extension, and may store the files. The terminal 120 may sort the files into folders, for example, Korea, Japan, and China, based on location information of the files, and may store the files.

For example, when synchronization of a JPG file is set by a user, only a file with a JPG extension in the meta information 310 of each of a plurality of files stored in the server 110 and the terminal 120 may be synchronized.

The server 110 may sort and store synchronized files based on a file extension, and the terminal 120 may sort and store synchronized files based on location information. The server 110 and the terminal 120 may use different schemes to sort and store the synchronized files.

When a folder suitable for the criteria is not created in the server 110 or the terminal 120 during synchronization, a folder may be automatically created based on meta information corresponding to the criteria, and a file may be synchronized in the created folder.

However, when the meta information corresponding to the criteria does not exist, a separate folder may be created, or the file may be stored in a specific folder among existing folders.

The criteria may be applied to at least one of items included in the meta information 310, for example, the creation time, the change time, the terminal information, the user information, the content summary information, and the like, in addition to the file extension and the location information.

Figure 5:
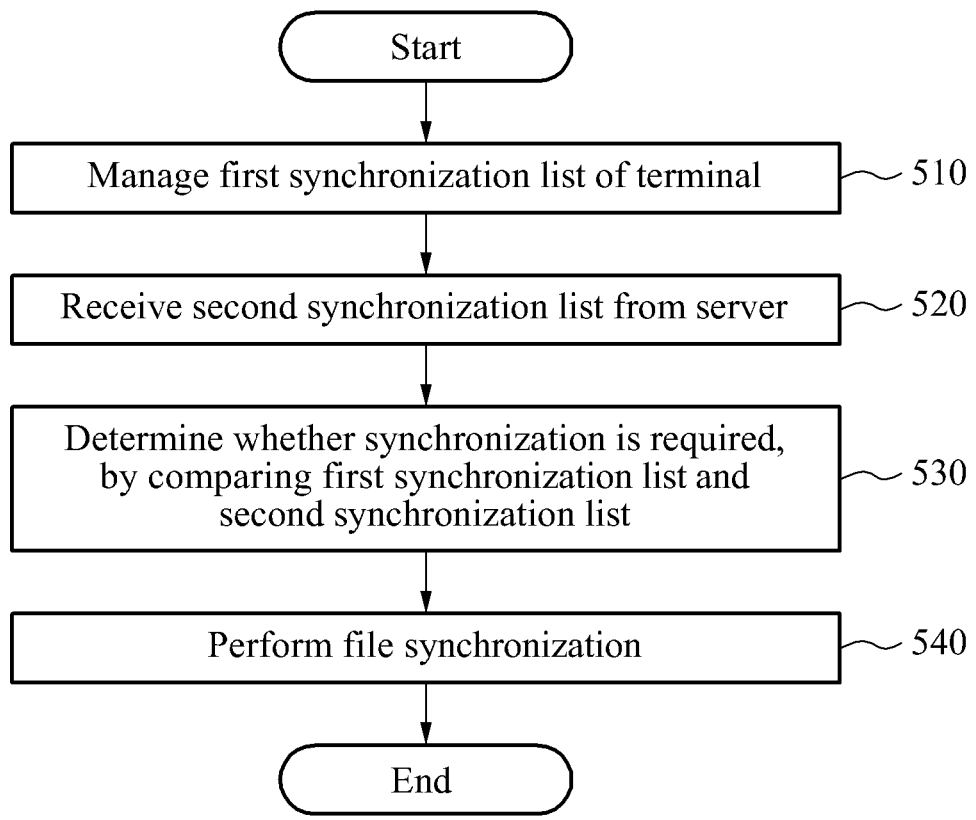
FIG. 5 is a flowchart illustrating an example of a data synchronization method of a terminal according to an embodiment.

FIG. 5 is a flowchart illustrating an example of a data synchronization method of the terminal 120 for performing data synchronization of at least one type of files with the server 110 connected through a network according to an embodiment. FIG. 5 illustrates an example in which the terminal 120 determines whether synchronization of each file is required.

In operation 510, a first synchronization list may be managed. The first synchronization list may be used to identify the at least one type of files among a plurality of files stored in the terminal 120.

The first synchronization list may include at least one file meeting a synchronization condition set in advance by a user, among the files stored in the terminal 120. The user may set at least one file type or a file extension as the synchronization condition.

In operation 520, a second synchronization list may be received from the server 110, when the terminal 120 is connected to the server 110 through the network. The second synchronization list may be used to identify the at least one type of files among a plurality of files stored in the server 110.

The second synchronization list may include at least one file corresponding to a preset synchronization condition, among the files stored in the server 110. The user may set at least one file type or a file extension as the synchronization condition.

In operation 530, the first synchronization list and the second synchronization list may be compared, and whether synchronization between the terminal 120 and the server 110 is required may be determined.

Whether the synchronization is required may be determined by comparing meta information of each of files included in the first synchronization list of the terminal 120 to meta information of each of files included in the second synchronization list of the server 110.

When a result obtained by the comparing indicates that a file of the server 110 is created or changed earlier than a file of the terminal 120, the file may be received from the server 110. Conversely, when the result indicates that the file of the terminal 120 is created or changed earlier than the file of the server 110, the file may be transmitted to the server 110.

In operation 540, a first file classified as a target file to be synchronized among the plurality of files may be synchronized, based on determination of whether the synchronization is required.

A folder of the terminal 120 in which the first file is stored, and a folder of the server 110 in which the first file is stored may be set to differ from each other, based on meta information of the first file.

The meta information of the first file may include at least one of a creation time, a change time, location information on a location in which the first file is created or changed, terminal information on a terminal that creates or changes the first file, user information, and content summary information, in association with the first file.

Additionally, the folders may be created in the terminal 120 and the server 110 differently based on at least one of the creation time, the change time, the location information, the terminal information, and the user information.

Figure 6:
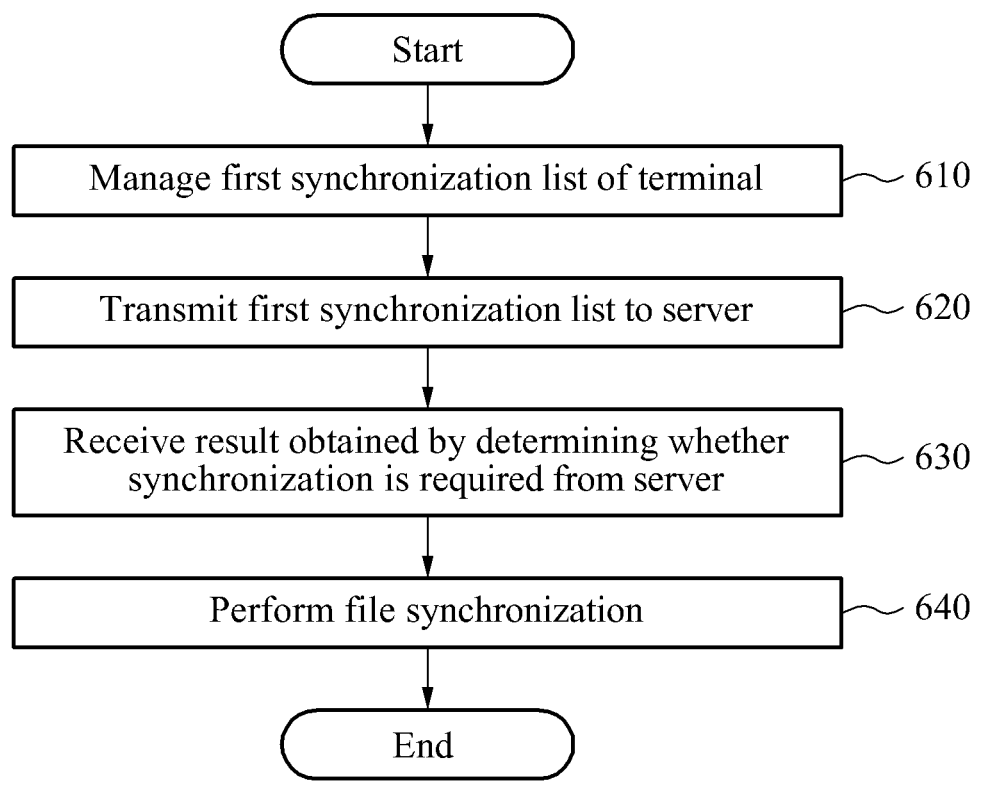
FIG. 6 is a flowchart illustrating another example of a data synchronization method of a terminal according to an embodiment.

FIG. 6 is a flowchart illustrating another example of a data synchronization method of the terminal 120 according to an embodiment. In FIG. 6, the terminal 120 may synchronize at least one preset type of files with the server 110 connected through a network, and the server 110 may determine whether synchronization of each file is required.

In operation 610, a first synchronization list may be managed. The first synchronization list may be used to identify at least one type of files among a plurality of files stored in the terminal 120.

The first synchronization list may refer to a list of at least one file meeting a preset synchronization condition, among the plurality of files. At least one file type or a file extension may be set as the synchronization condition.

In operation 620, the first synchronization list may be transmitted to the server 110, when the terminal 120 is connected to the server 110 through the network.

In operation 630, a result obtained by the server 110 determining whether synchronization between the terminal 120 and the server 110 is required may be received from the server 110.

In operation 640, a first file classified as a target file to be synchronized among the plurality of files may be synchronized, based on the received result.

When the first file is synchronized, a folder of the terminal 120 in which the first file is stored, and a folder of the server 110 in which the first file is stored may be set to differ from each other, based on meta information of the first file.

The meta information of the first file may include at least one of a creation time, a change time, location information on a location in which the first file is created or changed, terminal information on a terminal that creates or changes the first file, user information, and content summary information, in association with the first file.

Additionally, a folder in which the first file is stored may be created based on at least one of the creation time, the change time, the location information, the terminal information, and the user information.

Figure 7:
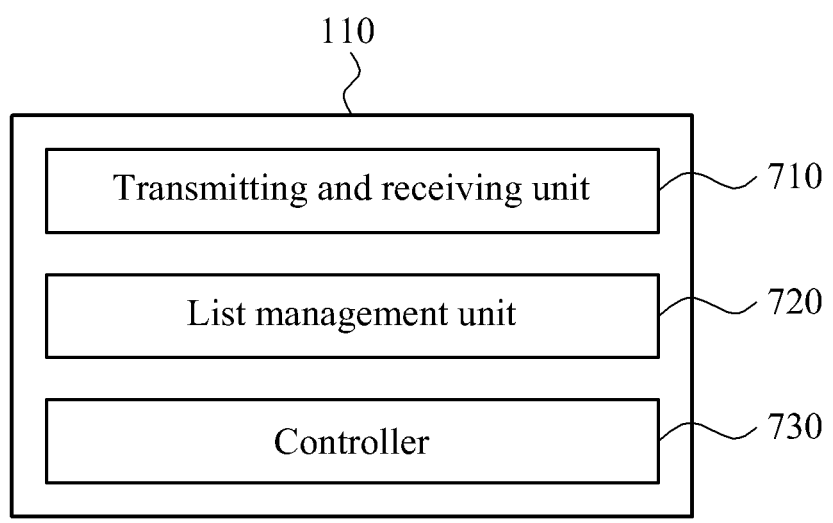
FIG. 7 is a block diagram illustrating a server according to an embodiment.

FIG. 7 is a block diagram illustrating a configuration of the server 110 according to an embodiment.

The server 110 may synchronize at least one type of files with at least one terminal 120 connected through a network. The server 110 may include a transmitting and receiving unit 710, a list management unit 720, and a controller 730.

The transmitting and receiving unit 710 may receive a first synchronization list from the terminal 120, when the server 110 is connected to the terminal 120 through the network. The first synchronization list may be used to identify the at least one type of files stored in the terminal 120.

The first synchronization list may be generated with files corresponding to the at least one type or a file extension among files stored in the terminal 120.

The list management unit 720 may manage a second synchronization list. The second synchronization list may be used to identify the at least one type of files among a plurality of files stored in the server 110.

The second synchronization list may be generated with files corresponding to the at least one type or a file extension among the files stored in the server 110.

The controller 730 may compare the first synchronization list to the second synchronization list, and may determine whether synchronization between the terminal 120 and the server 110 is required for each of the files included in the first synchronization list and the second synchronization list. Additionally, the controller 730 may synchronize a first file classified as a target file to be synchronized among the files, based on a result of the determining.

When the first file is synchronized, a folder of the terminal 120 in which the first file is stored, and a folder of the server 110 in which the first file is stored may be set to differ from each other, based on meta information of the first file.

The meta information may include at least one of a creation time, a change time, location information on a location in which the first file is created or changed, terminal information on a terminal that creates or changes the first file, user information, and content summary information, in association with the first file. Based on at least one item of the meta information, a folder in which the first file is stored may be created in each of the server 110 and the terminal 120.

Figure 8:
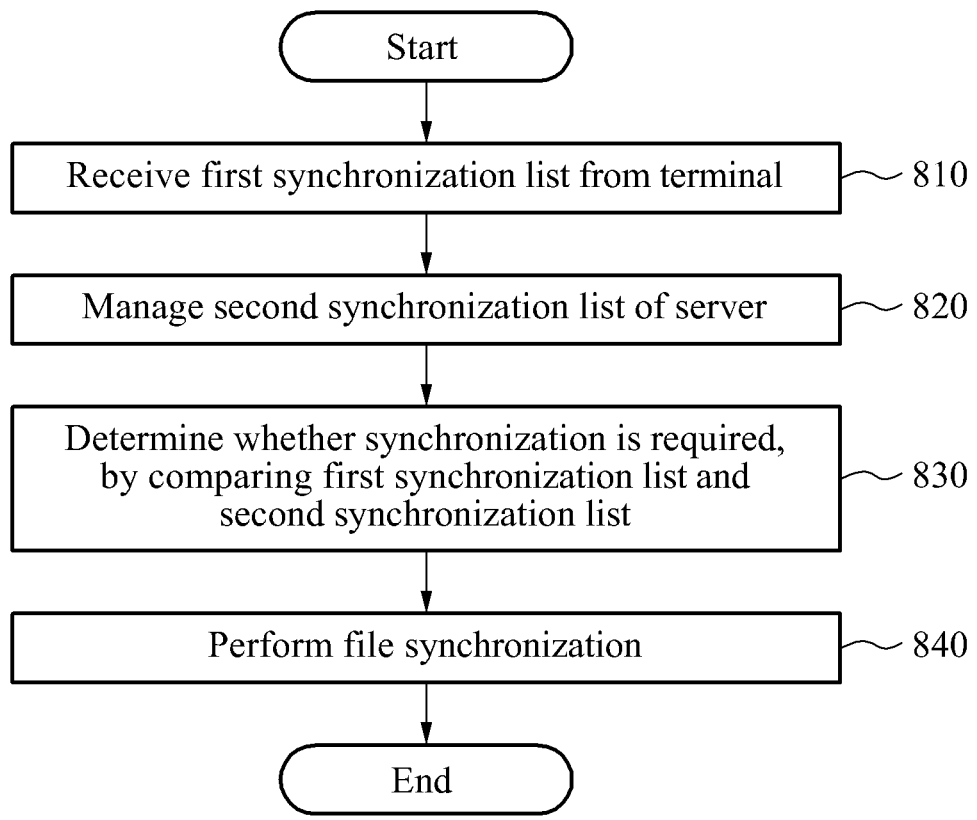
FIG. 8 is a flowchart illustrating an example of a data synchronization method of a server according to an embodiment.

FIG. 8 is a flowchart illustrating an example of a data synchronization method of the server 110 for performing data synchronization of at least one preset type of files with the terminal 120 connected through a network according to an embodiment. FIG. 8 illustrates an example in which the server 110 determines whether synchronization of each file is required.

In operation 810, a first synchronization list may be received from the terminal 120, when the server 110 is connected to the terminal 120 through the network. The first synchronization list may be used to identify the at least one type of files stored in the terminal 120.

The first synchronization list may refer to a list of files corresponding to at least one preset type among files stored in the terminal 120. For example, when a file corresponds to the at least one type, based on a file extension included in meta information of the file, the file may be included in the first synchronization list.

In operation 820, a second synchronization list may be managed. The second synchronization list may be used to identify the at least one type of files among a plurality of files stored in the server 110.

The second synchronization list may refer to a list of files corresponding to the at least one type among the files stored in the server 110. For example, when a file corresponds to the at least one type, based on a file extension included in meta information of the file, the file may be included in the second synchronization list.

In operation 830, the first synchronization list and the second synchronization list may be compared, and whether synchronization between the terminal 120 and the server 110 is required for each of the files included in the first synchronization list and the second synchronization list.

Whether the synchronization is required may be determined by comparing meta information of each of files included in the second synchronization list of the server 110 and meta information of each of files included in the first synchronization list of the terminal 120.

When a result obtained by the comparing indicates that a file of the terminal 120 is created or changed earlier than a file of the server 110, the file may be received from the terminal 120. Conversely, when the result indicates that the file of the server 110 is created or changed earlier than the file of the terminal 120, the file may be transmitted to the terminal 120.

In operation 840, first synchronization may be performed based on determination of whether the synchronization is required.

When the file synchronization is performed, a folder of the server 110 in which a first file is stored, and a folder of the terminal 120 in which the first file is stored may be set to differ from each other, based on meta information of the first file.

The meta information may include at least one of a creation time, a change time, location information on a location in which the first file is created or changed, terminal information on a terminal that creates or changes the first file, user information, and content summary information, in association with the first file. Based on at least one item of the meta information, a folder in which the first file is stored may be created in each of the server 110 and the terminal 120.

Figure 9A:
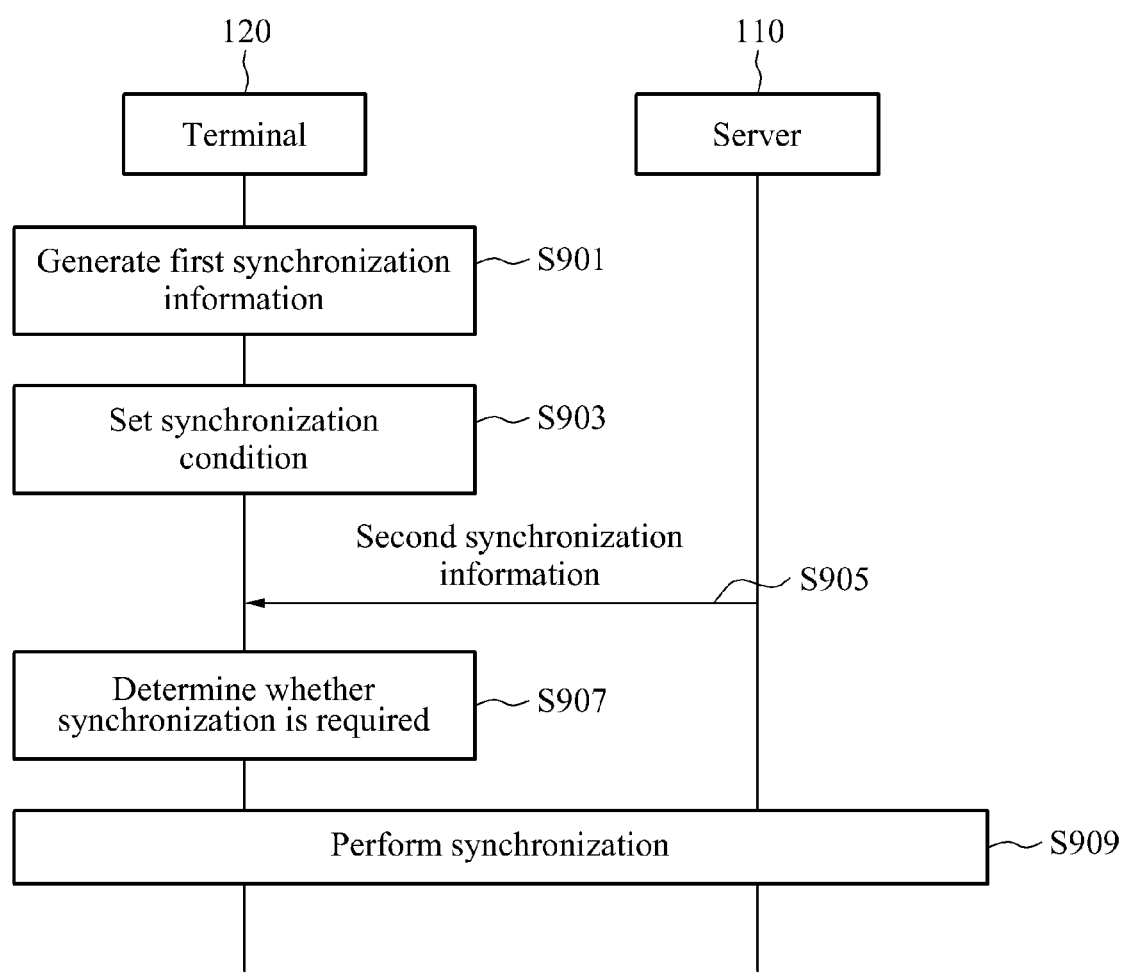

FIG. 9A illustrates an example of operations of a server and a terminal according to an embodiment. The example of FIG. 9A will be further described with reference to FIGS. 10A, 10B and 11A.

In operation S901, the terminal 120 may generate first synchronization information. The first synchronization information generated by the terminal 120 may include meta information indicating an attribute of each of at least one file stored in the terminal 120 and an identifier of each of the at least one file. For example, the terminal 120 may generate first synchronization information of FIG. 10A.

FIG. 10A illustrates first synchronization information 1000 according to an embodiment.

Referring to FIG. 10A, the first synchronization information 1000 may include a file identifier 1001, and meta information 1010. In FIG. 10A, the terminal 120 may include a first picture file, a second picture file, a third picture file, a first e-mail file, a second e-mail file, a first document file, and a second document file. The first synchronization information 1000 may include identifiers 1021 through 1023 of the first picture file through the third picture file, an identifier 1024 of the first e-mail file, an identifier 1025 of the second e-mail file, an identifier 1026 of the first document file, and an identifier 1027 of the second document file.

The first synchronization information 1000 may include, as the meta information 1010, extension information 1011, file creation time information 1012, file creation place information 1013, and device information 1014. The above types of meta information are merely an example, and accordingly the meta information may further include user information, content summary information, file change time information, file change place information, and the like.

In an example, when a file type corresponds to a picture, the first synchronization information 1000 may include, as meta information, at least one of an extension, a related program, a storage location, a size, a creation time, a modification time, an access time, file permission, a title, a theme, a grade, a tag, a description, a photographer, a copyright, a picture size, pixel information, coordinates of a photographing site, a language in use, a type of a used terminal, an exposure level, whether to use a flash, a shutter speed, a resolution, a bit level, compression-related information, a unit of resolution, a representative color, an International Organization for Standardization (ISO) sensitivity, an exposure bias, a focal distance, a maximum aperture opening, a sidelight mode, an object distance, a lens manufacturer, a lens model, a flash manufacturer, a flash model, a brightness, a light source, an exposure program, a chroma, a sharpness, a white balance, a luminous intensity analysis, and digital zoom in/out-related information.

In another example, when a file type corresponds to an e-mail, the first synchronization information 1000 may include, as meta information, at least one of a file name, a type, a folder location, a size, a creation time, a modification time, a place in which a file is created or modified, and an owner.

In still another example, when a file type corresponds to a document, the first synchronization information 1000 may include, as meta information, at least one of a writer, a last saved by, a number of modifications, a version number, a program name, company information, a manager, a content creation time, a storage time, a print time, a time required for editing, a content state, a content form, a page, a number of words, a number of characters, a number of lines, a number of paragraphs, a template file, a magnification, a language, a file name, a type, a location of a folder in which a file is stored, a creation time, a modification time, a size, and a creation place.

The terminal 120 may generate and manage, as meta information of the first picture file, "JPG," "2013.7.10," "Seoul," and device information indicating that the first picture file is created by a first device. The terminal 120 may generate and manage, as meta information of the second picture file, "JPG," "2013.7.10," "Seoul," and device information indicating that the second picture file is created by the first device. The terminal 120 may generate and manage, as meta information of the third picture file, "JPG," "2013.8.11," "Busan," and device information indicating that the third picture file is created by a second device The terminal 120 may generate and manage, as meta information of the first e-mail file, "eml," "2013.7.10," "Seoul," and device information indicating that the first e-mail file is created by the second device. The terminal 120 may generate and manage, as meta information of the second e-mail file, "eml," "2013.8.11," "Busan," and device information indicating that the second e-mail file is created by the second device.

The terminal 120 may generate and manage, as meta information of the first document file, "doc," "2013.7.10," "Seoul," and device information indicating that the first document file is created by the first device. The terminal 120 may generate and manage, as meta information of the second document file, "doc," "2013.8.11," "Seoul," and device information indicating that the second document file is created by the second device.

Referring back to FIG. 9A, in operation S903, the terminal 120 may set a synchronization condition. For example, the terminal 120 may set at least one item of the meta information as a synchronization condition.

In an example, referring to FIG. 11A, the terminal 120 may provide a user interface (UI) enabling setting of a first synchronization condition, and may set a synchronization condition based on a selection of a user. In another example, the terminal 120 may set a synchronization condition based on a preset condition. In still another example, the terminal 120 may receive a synchronization condition set by another apparatus, and may set the received synchronization condition as a synchronization condition.

In operation S905, the terminal 120 may receive second synchronization information from the server 110. For example, the terminal 120 may receive second synchronization information 1050 of FIG. 10B from the server 110. Referring to FIG. 10B, the second synchronization information 1050 may include information regarding a fourth picture file, a third e-mail file and a third document file, in addition to the first synchronization information 1000. Additionally, the second synchronization information 1050 may include an identifier 1028 of the fourth picture file, an identifier 1029 of the third e-mail file, and an identifier 1030 of the third document file.

The server 110 may generate and manage, as meta information of the fourth picture file, "JPG," "2013.7.10," "Seoul," and device information indicating that the fourth picture file is created by a third device. The server 110 may generate and manage, as meta information of the third e-mail file, "eml," "2013.8.11," "Busan," and device information indicating that the third e-mail file is created by the first device. The server 110 may generate and manage, as meta information of the third document file, "doc," "2013.8.11," "Busan," and device information indicating that the third document file is created by the first device.

In operation S907, the terminal 120 may determine whether synchronization is required, based on a comparison between the first synchronization information 1000 and the second synchronization information 1050. The terminal 120 may compare the first synchronization information 1000 and the second synchronization information 1050, based on the synchronization condition. For example, in FIG. 11A, a picture, that is, an extension may be determined as a synchronization condition. The terminal 120 may compare files with a JPG extension between the first synchronization information 1000 and the second synchronization information 1050. The terminal 120 may determine that the second synchronization information 1050 may further include the information regarding the fourth picture file in comparison to the first synchronization information 1000. In other words, the terminal 120 may determine a difference between the first synchronization information 1000 and the second synchronization information 1050, and may determine to perform synchronization. When the first synchronization information and the second synchronization information are determined to be identical to each other, the terminal 120 may determine not to perform synchronization.

In operation S909, the server 110 and the terminal 120 may perform the synchronization, when the synchronization is determined to be required.

An example in which the terminal 120 determines whether synchronization is required has been described above. Hereinafter, an example in which the server 110 determines whether synchronization is required will be described.

FIG. 9B illustrates another example of operations of a server and a terminal according to an embodiment.

In operation S901, the terminal 120 may generate first synchronization information. In operation S903, the terminal 120 may set a synchronization condition. In operation S915, the terminal 120 may transmit, to the server 110, the first synchronization information and the set synchronization condition. For example, the terminal 120 may transmit, to the server 110, the first synchronization information 1000 of FIG. 10A, and a synchronization condition set to be a JPG extension in meta information.

In operation S917, the server 110 may compare the received first synchronization information and second synchronization information generated by the server 110, based on the synchronization condition, and may determine whether synchronization is required based on a result of the comparing. When the synchronization is determined to be required, the server 110 and the terminal 120 may perform the synchronization in operation S919.

Figure 9C:
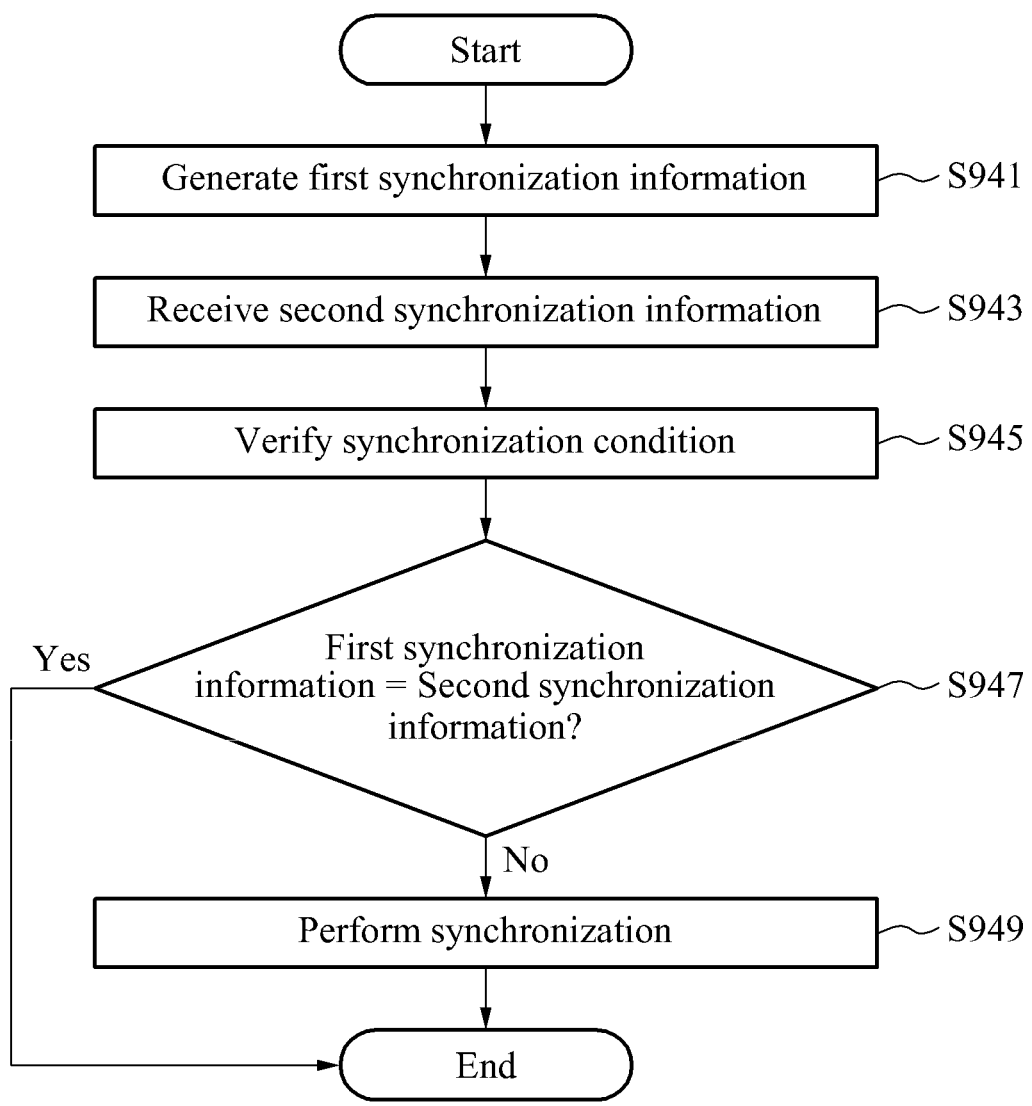

The examples of FIGS. 9A and 9B in which the terminal 120 and the server 110 determine whether the synchronization is required, respectively, have been described. FIG. 9C illustrates an example of operations of a server or a terminal according to an embodiment.

In operation S941, the terminal or the server may generate first synchronization information. The first synchronization information may refer to synchronization information for a file included in an operator in the example of FIG. 9C. In operation S943, the terminal or the server may receive second synchronization information from another apparatus. The second synchronization information may refer to synchronization information for a file included in the other apparatus. In an example, when the terminal performs operations of FIG. 9C, the other apparatus may be the server, or another terminal. In another example, when the server performs operations of FIG. 9C, the other apparatus may be the terminal, or another server.

In operation S945, the terminal or the server may verify a synchronization condition. In an example, the terminal or the server may verify a synchronization condition set by a user. In another example, the terminal or the server may verify a synchronization condition set by a preset rule. In still another example, the terminal or the server may verify a synchronization condition received from another apparatus.

In operation S947, the terminal or the server may determine, based on the synchronization condition, whether the first synchronization information and the second synchronization information are identical to each other. The terminal or the server may compare meta information meeting the synchronization condition between the first synchronization information and the second synchronization information. The terminal or the server may determine a target file that is to be synchronized, based on a result of the comparing of the meta information.

When the first synchronization information and the second synchronization information are determined to be different from each other in operation S947-N, the terminal or the server may synchronize the target file. When the first synchronization information and the second synchronization information are determined to be identical to each other in operation S947-Y, the terminal or the server may not synchronize the target file.

Figure 9D:
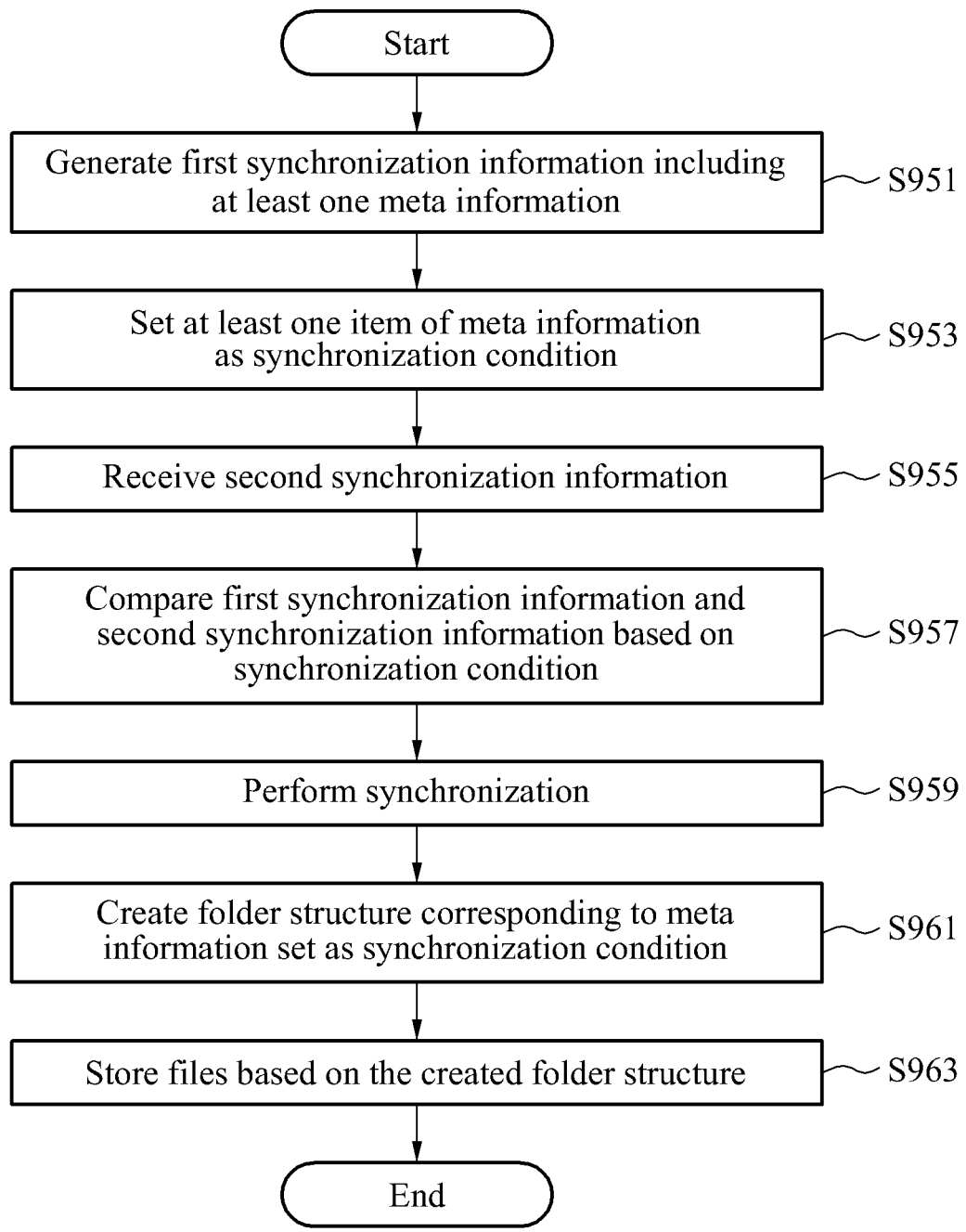

FIG. 9D illustrates another example of operations of a server or a terminal according to an embodiment. The example of FIG. 9D will be further described with reference to FIGS. 11A through 11F.

In operation S951, the server or the terminal may generate first synchronization information including at least one meta information. For example, the server or the terminal may generate and manage the first synchronization information 1000 of FIG. 10A.

In operation S953, the server or the terminal may set at least one item of the at least one meta information as a synchronization condition. For example, the server or the terminal may set a JPG extension as a synchronization condition, as shown in FIG. 11A. The JPG extension, that is, one item of the meta information 1010 of the synchronization condition 1000 of FIG. 10A is set as a synchronization condition as shown in FIG. 11A, however, this is merely an example. The server or the terminal may set, as a synchronization condition, both the JPG extension and a file creation time, or both the JPG extension and an eml extension.

In operation S955, the server or the terminal may receive second synchronization information from another apparatus. For example, the server or the terminal may receive the second synchronization information 1050 of FIG. 10B.

The server or the terminal may compare the first synchronization information 1000 and the second synchronization information 1050, based on the JPG extension set as the synchronization condition. The server or the terminal may determine that the second synchronization information 1050 further includes the fourth picture file with the JPG extension, and may determine the fourth picture file as a target file to be synchronized.

The server or the terminal may synchronize the target file. For example, the server or the terminal may receive the fourth picture file from another apparatus.

Figure 11B:
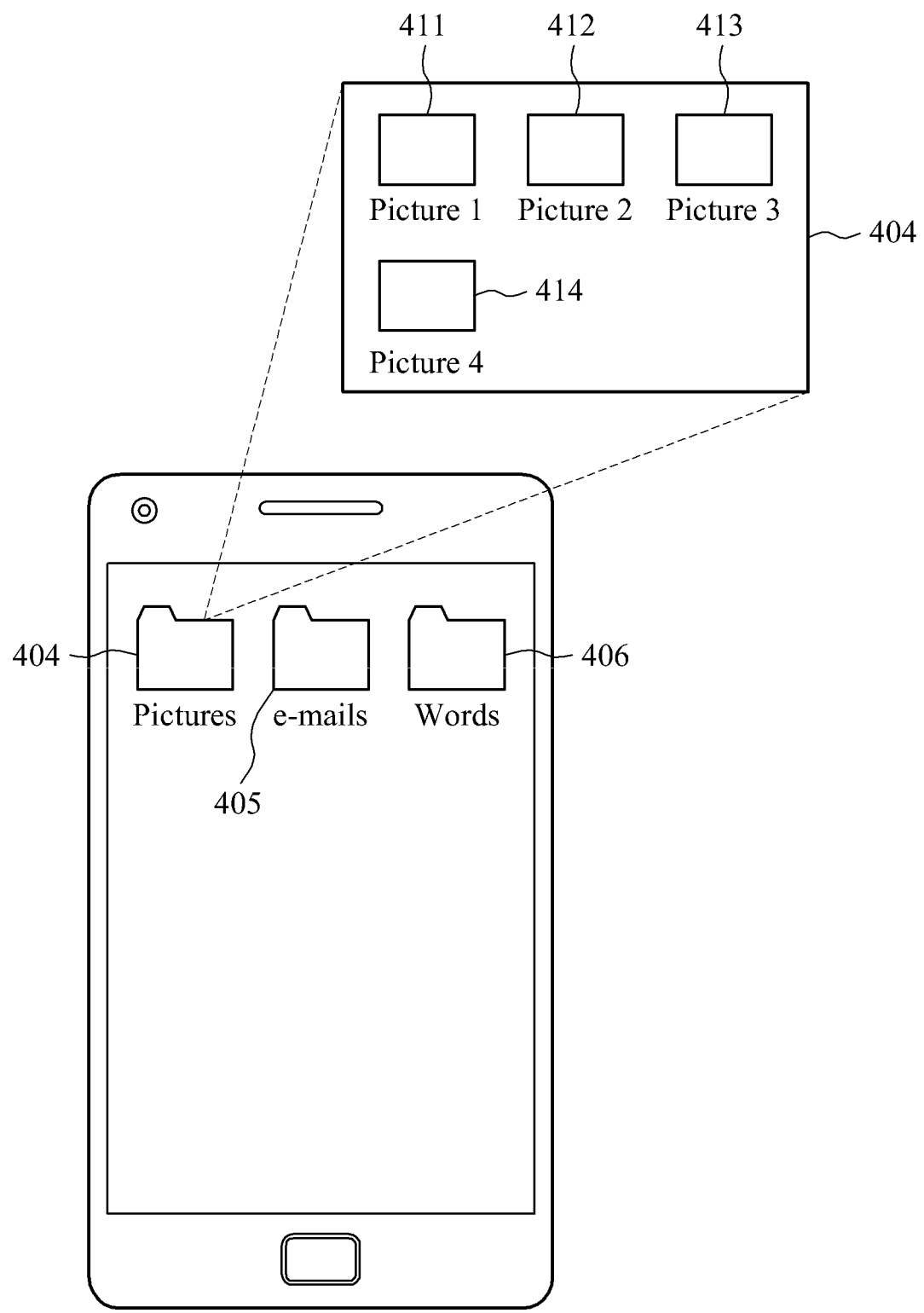

The server or the terminal may create a folder structure corresponding to meta information set as the synchronization condition. For example, when a JPG extension is set as a synchronization condition, the server or the terminal may create folders for other extensions in the same layer as the JPG extension in a parallel folder structure. Referring to FIG. 11B, the server or the terminal may create a JPG folder 404 for JPG files, an eml folder 405 for eml files, and a doc folder 406 for doc files. In other words, the server or the terminal may create folders for each category of the meta information set as the synchronization condition.

Referring back to FIG. 9D, in operation S963, the server or the terminal may store files based on the created folder structure. For example, the server or the terminal may store, in the JPG folder 404, existing files, that is, a first picture file 411, a second picture file 412 and a third picture file 413, and a fourth picture file 414 that is synchronized and received, as shown in FIG. 11B. Although not shown in the drawings, a first e-mail file and a second e-mail file may be stored in the eml folder 405, and a first document file and a second document file may be stored in the doc folder 406. Because synchronization may be performed on a JPG extension, not an eml extension and a doc extension, the first e-mail file and the second e-mail file may be stored in the eml folder 405, and the first document file and the second document file may be stored in the doc folder 406.

FIG. 11C illustrates an example in which a file creation time "2013.7.10" is set as a synchronization condition. A terminal may provide a UI including a designation block 421 to designate "2013.7.10," and a designation block 422 to designate "2013.8.11." A user may designate the designation block 421, and the terminal 120 may set "2013.7.10" as a synchronization condition.

Figure 11D:
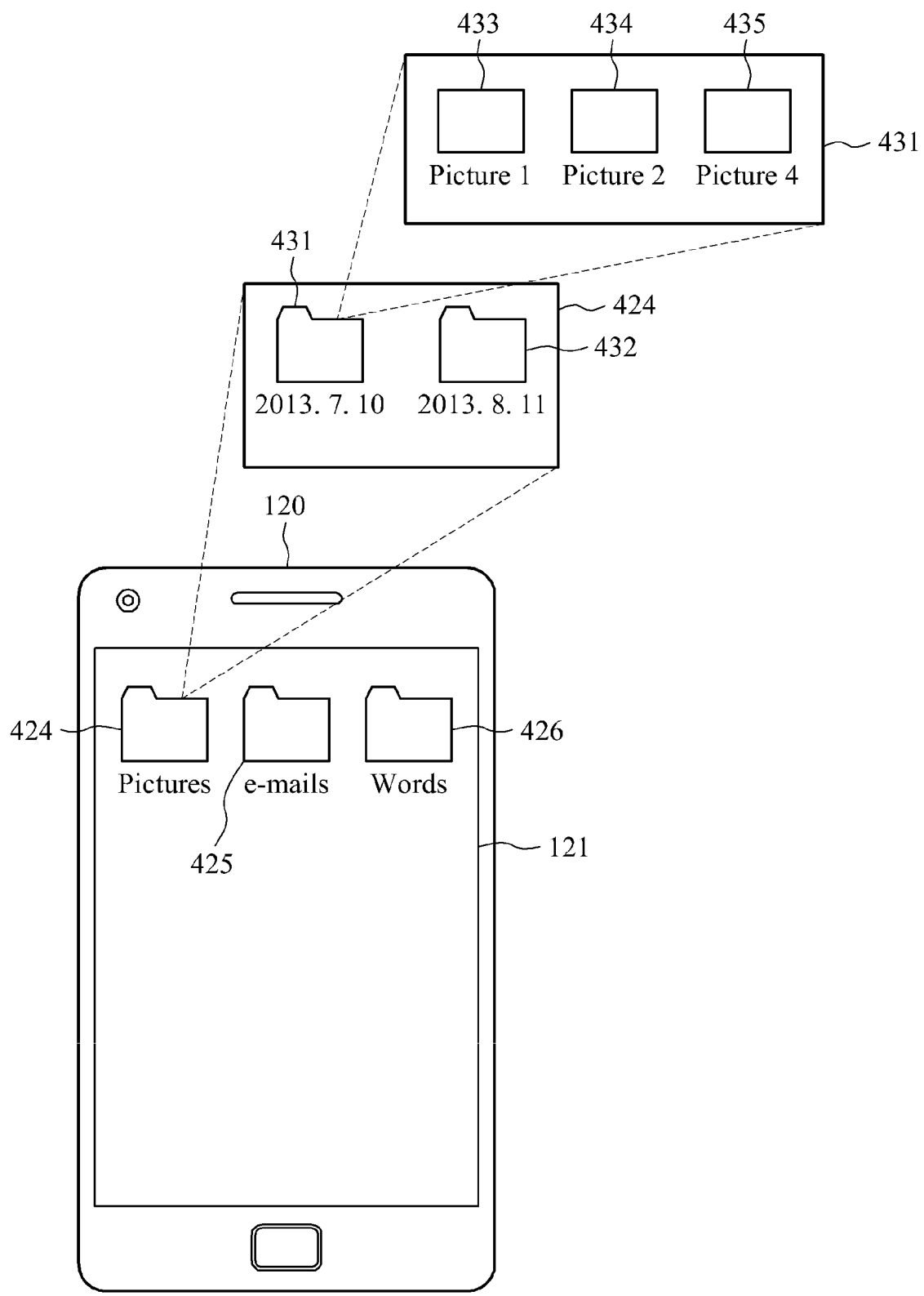

Referring to FIG. 11D, the terminal 120 may create and display the folders 431 and 432 based on a file creation time, in the JPG folder 424. In addition, the terminal 120 may store a first picture file 433, a second picture file 434, and a fourth picture file 435 that correspond to "2013.7.10" in the folder 431 corresponding to "2013.7.10."

Figure 11E:
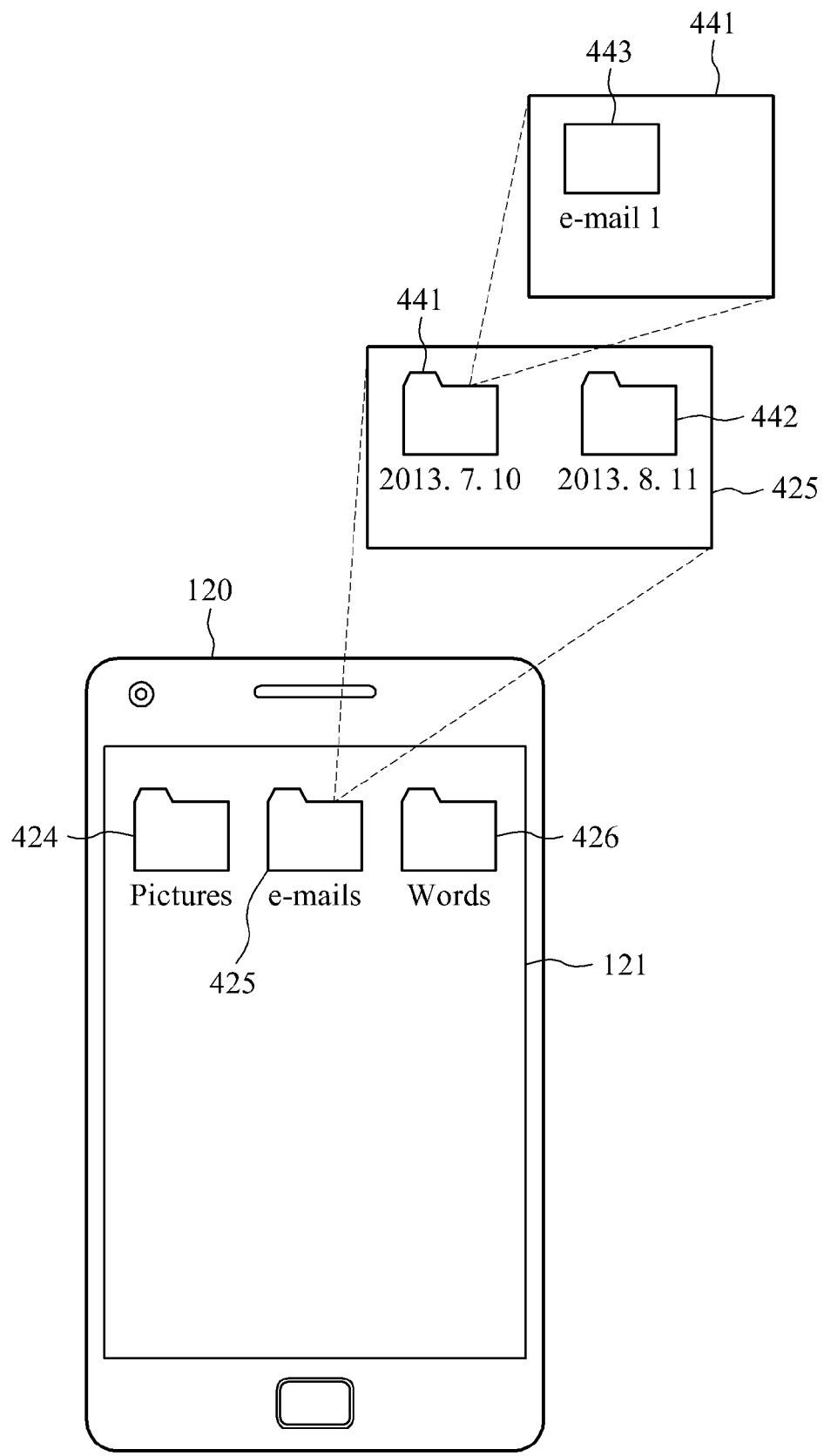

Referring to FIG. 11E, the terminal 120 may create and display the folders 441 and 442 based on a file creation time, in the eml folder 425. In addition, the terminal 120 may store the first e-mail file 443 corresponding to "2013.7.10" in the folder 441 corresponding to "2013.7.10."

Figure 11F:
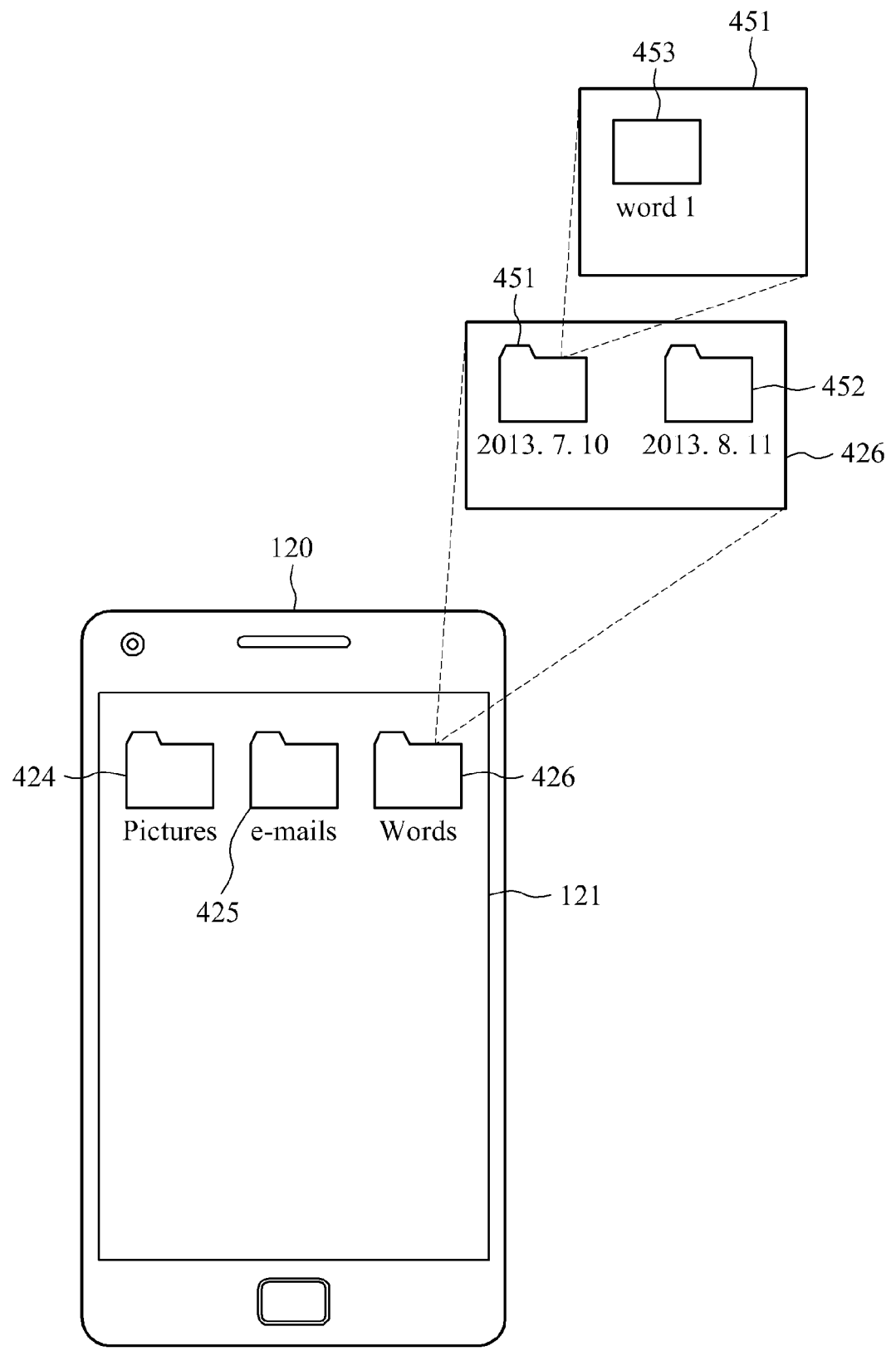

Referring to FIG. 11F, the terminal 120 may create and display folders 451 and 452 based on a file creation time, in a doc folder 426 for doc files. In addition, the terminal 120 may store a first document file 453 corresponding to "2013.7.10" in the folder 451 corresponding to "2013.7.10."

Figure 11G:
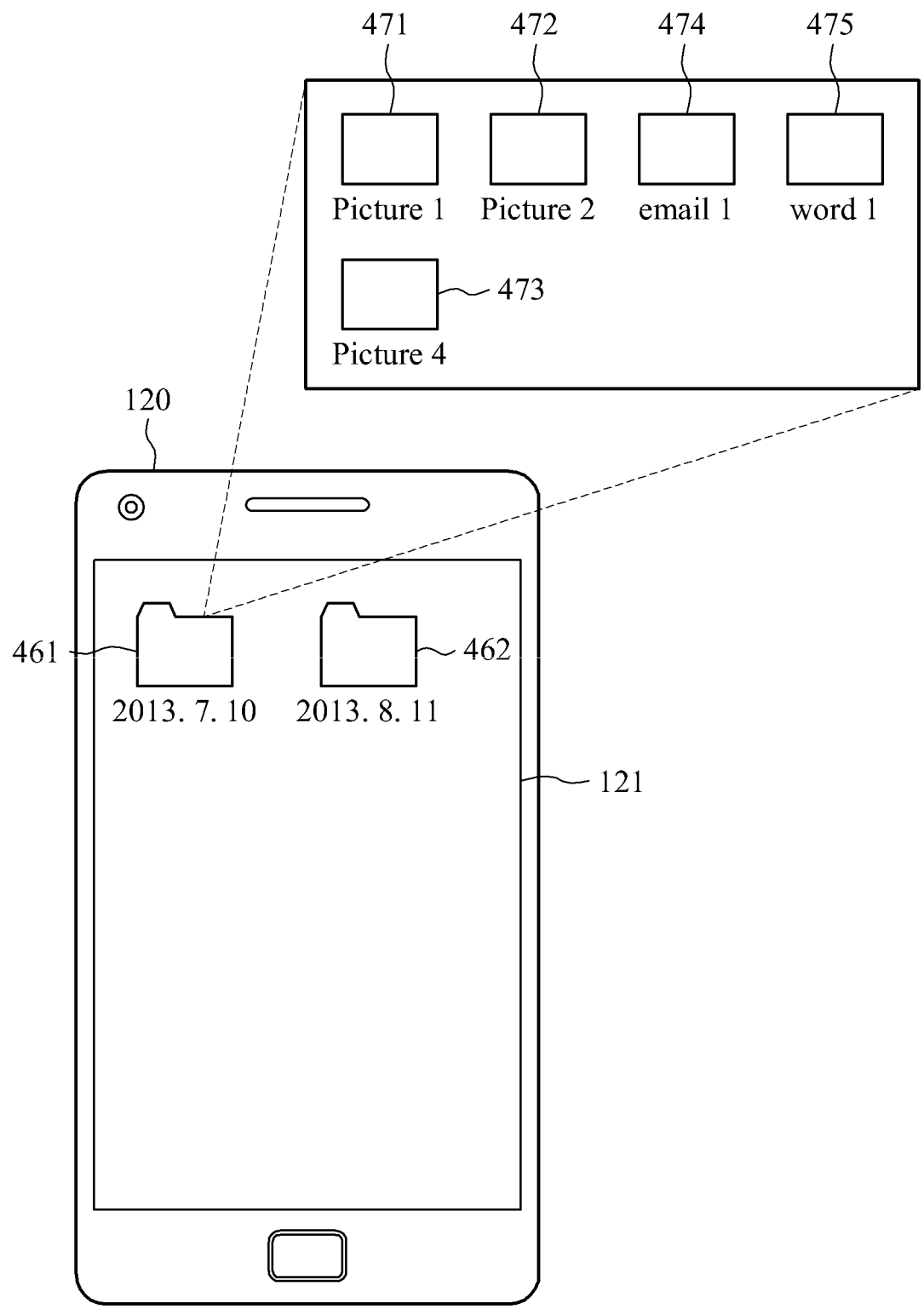

Referring to FIG. 11G, the terminal 120 may create and display folders 461 and 462 based on a file creation time, as a top level of a directory. In addition, the terminal 120 may store a first picture file 471, a second picture file 472, a fourth picture file 473, a first e-mail file 474, and a first document file 475 that correspond to "2013.7.10" in the folder 461 corresponding to "2013.7.10."

As described above, the terminal may create a structure of folders based on a set synchronization condition, using various schemes, and may store at least one file in the created structure based on meta information of each of the at least one file.

Figure 12A:
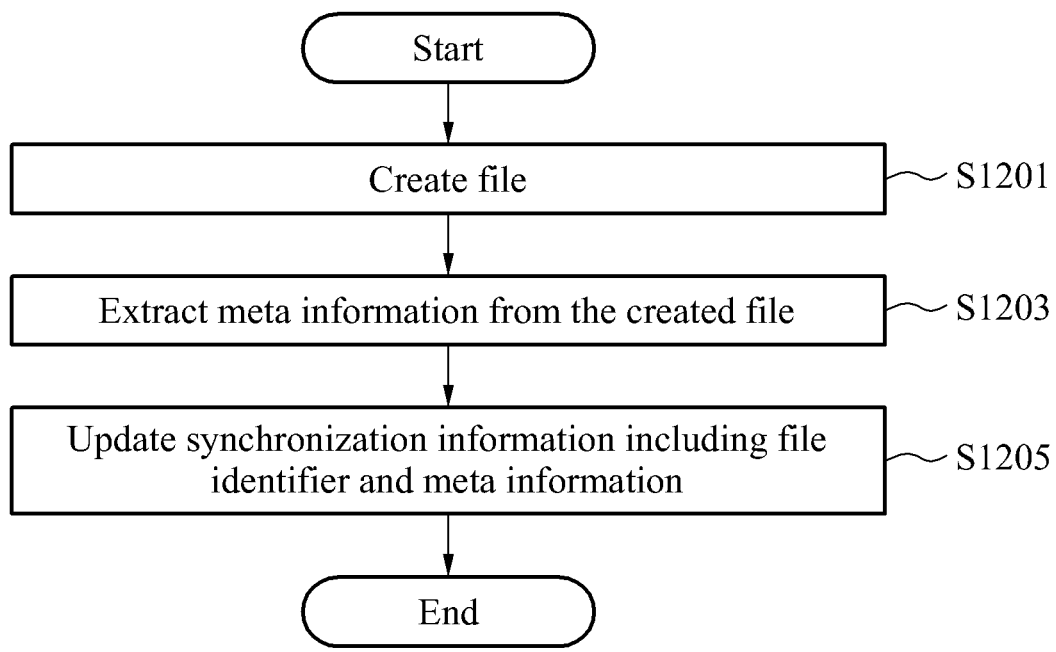
FIGS. 12A through 12D are flowcharts illustrating examples of operations of a terminal according to an embodiment.

FIG. 12A illustrates an example of a synchronization information generation process according to an embodiment.

In operation S1201, the terminal 120 may create or update a file. In operation S1203, the terminal 120 may extract meta information from the file. The file may have a data structure based on a preset standard. The preset standard may include at least one item of meta information indicating an attribute of a file. For example, when a file is based on a Joint Photographic Experts Group (JPEG) standard, the terminal 120 may extract meta information, based on a header portion or metadata portion of a new file.

In operation S1205, the terminal 120 may generate or update synchronization information including a file identifier and the extracted meta information.

Figure 12B:
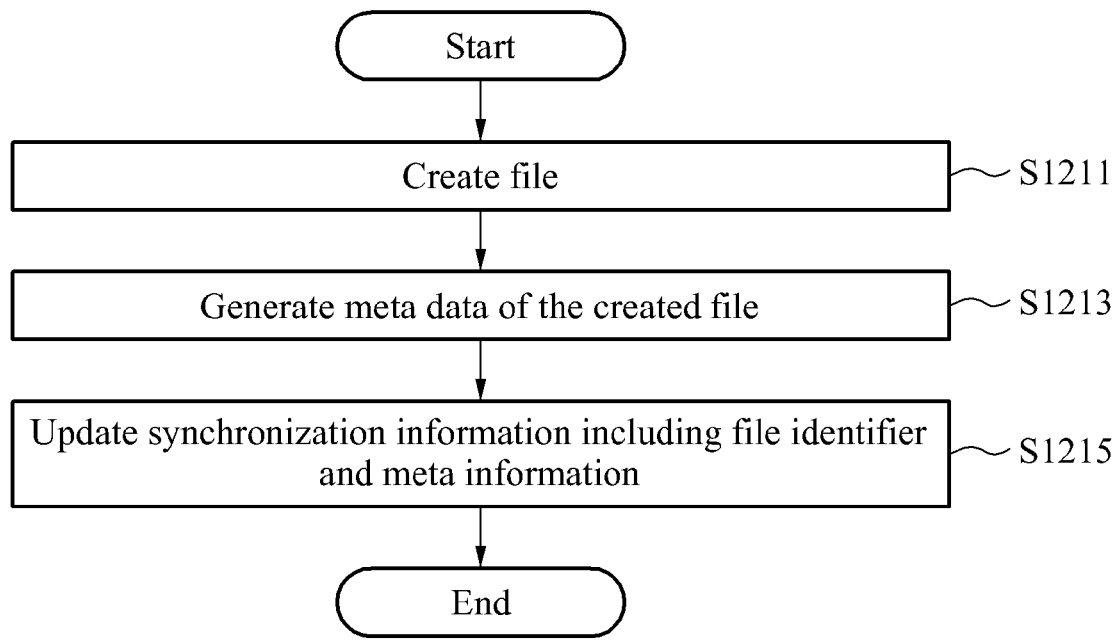

FIG. 12B illustrates another example of a synchronization information generation process according to an embodiment.

In operation S1211, the terminal 120 may create or update a file. In operation S1213, the terminal 120 may generate meta information of the file. For example, the file may not include location information on a location in which the file is created or updated. The terminal 120 may not extract the location information from the file. Accordingly, a current location of the terminal 120 may be measured using a positioning module, for example, Global Positioning System (GPS) module, and a location in which a corresponding file is created or updated may be set as the current location of the terminal 120.

In operation S1215, the terminal 120 may generate synchronization information including a file identifier and the generated meta information.

Figure 12C:
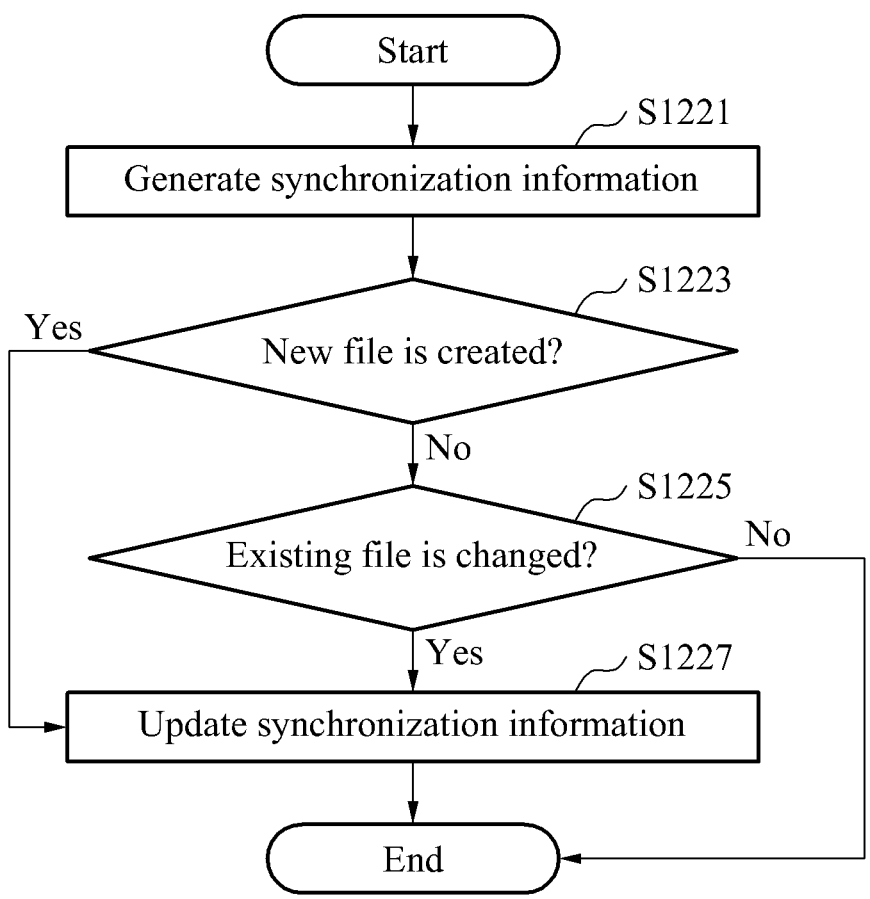

FIG. 12C illustrates an example of an operation of a terminal according to an embodiment.

In operation S1221, the terminal 120 may generate synchronization information. When a new file is created in operation S1223-Y, the terminal 120 may update the synchronization information by adding an identifier and meta information of the new file in operation S1227. When an existing file is updated in operation S1225-Y, the terminal 120 may update the synchronization information by changing an identifier and meta information of the existing file to an updated identifier and updated meta information in operation S1227.

Figure 12D:
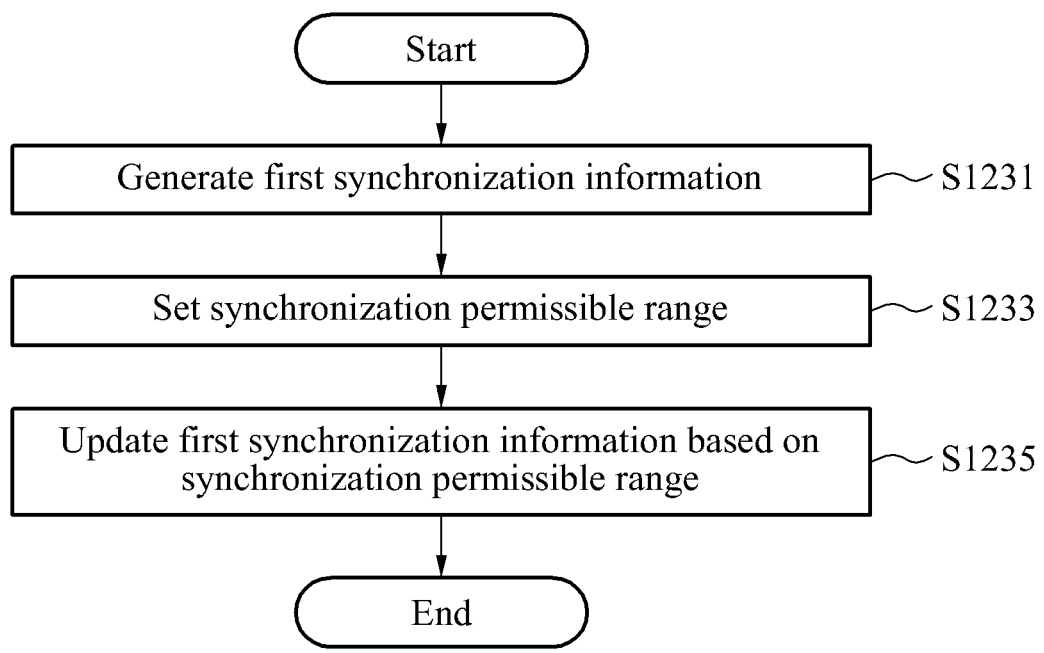

FIG. 12D illustrates another example of an operation of a terminal according to an embodiment.

In operation S1231, the terminal 120 may generate first synchronization information. In operation 1233, the terminal 120 may set a synchronization permissible range. For example, the terminal 120 may set a file permitted to be synchronized among at least one file included in the first synchronization information. The terminal 120 may provide a UI to set the first synchronization information and a permissible range for synchronization. In operation S1235, the terminal 120 may update the first synchronization information, based on the synchronization permissible range.

For example, a user may set a JPG extension in the first synchronization information 1000 of FIG. 10A, as a synchronization condition, and may set a synchronization permissible range to permit only the first picture file and the second picture file to be synchronized. Accordingly, the terminal 120 may delete identification information and meta information of the third picture file from the first synchronization information 1000.

Figure 13A:
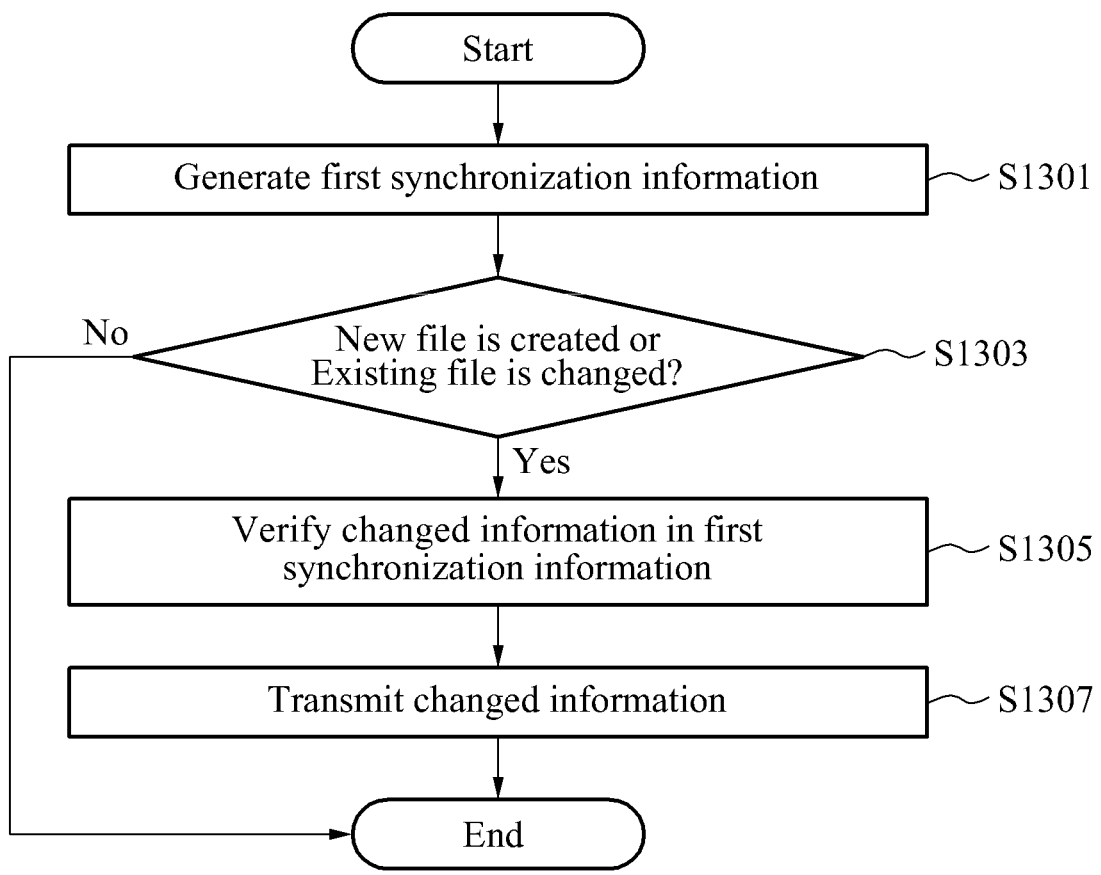
FIG. 13A is a flowchart illustrating another example of an operation of a terminal according to an embodiment.

FIG. 13A illustrates still another example of an operation of a terminal according to an embodiment. The example of FIG. 13A will be further described with reference to FIG. 13B. In FIG. 13A, whether synchronization is required may be determined by an apparatus other than the terminal, for example, a server.

Referring to FIG. 13A, in operation S1301, the terminal 120 may generate first synchronization information. For example, in FIG. 13A, the first synchronization information 1000 of FIG. 10A may be generated.

In operation S1303, the terminal 120 may create a new file, or may change an existing file. For example, the terminal 120 may create a fourth picture file.

In operation S1305, the terminal 120 may verify changed information in the first synchronization information. For example, as shown in FIG. 13B, the terminal 120 may verify addition of identification information and meta information of a fourth picture file 1330 to the first synchronization information 1000.

In operation S1307, the terminal 120 may transmit, to a server, only the changed information, instead of transmitting the entire first synchronization information. The server 110 may compare the changed information and second synchronization information, and may determine whether synchronization is required, based on a result of the comparing.

Figure 13C:
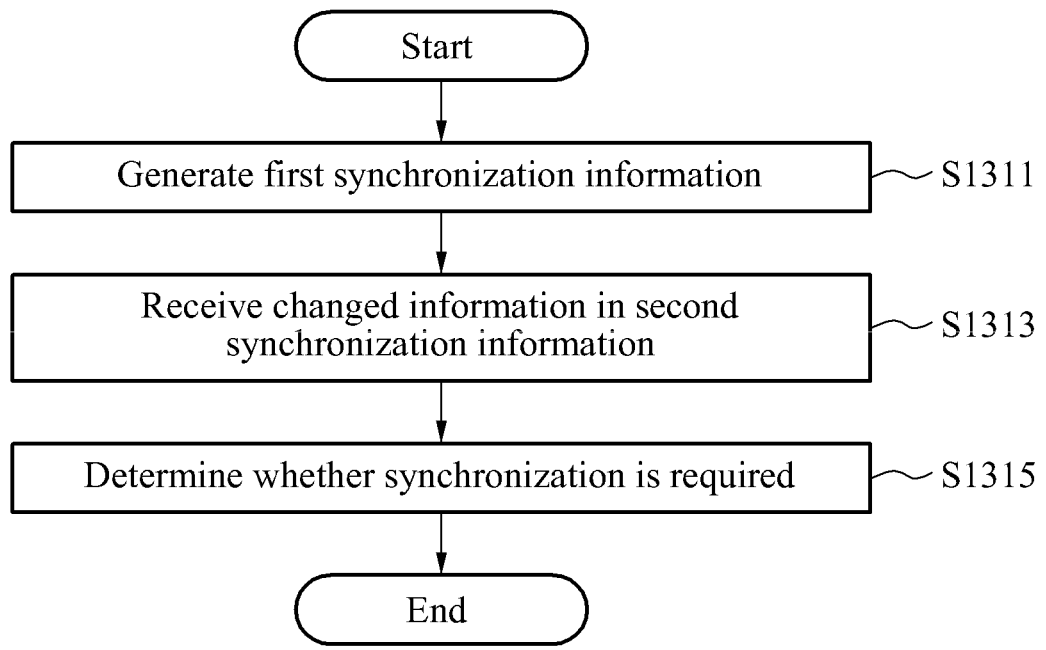
FIG. 13C is a flowchart illustrating still another example of an operation of a terminal according to an embodiment.

FIG. 13C illustrates yet another example of an operation of a terminal according to an embodiment. In FIG. 13C, the terminal 120 may receive second synchronization information from another apparatus, for example, the server 110, and may store the second synchronization information.

Referring to FIG. 13C, in operation S1311, the terminal 120 may generate first synchronization information. In operation S1313, the terminal 120 may receive changed information in second synchronization information from another apparatus, for example, the server 110. In operation S1315, the terminal 120 may compare the first synchronization information and the changed information in the second synchronization information, and may determine whether synchronization is required.

Figure 14:
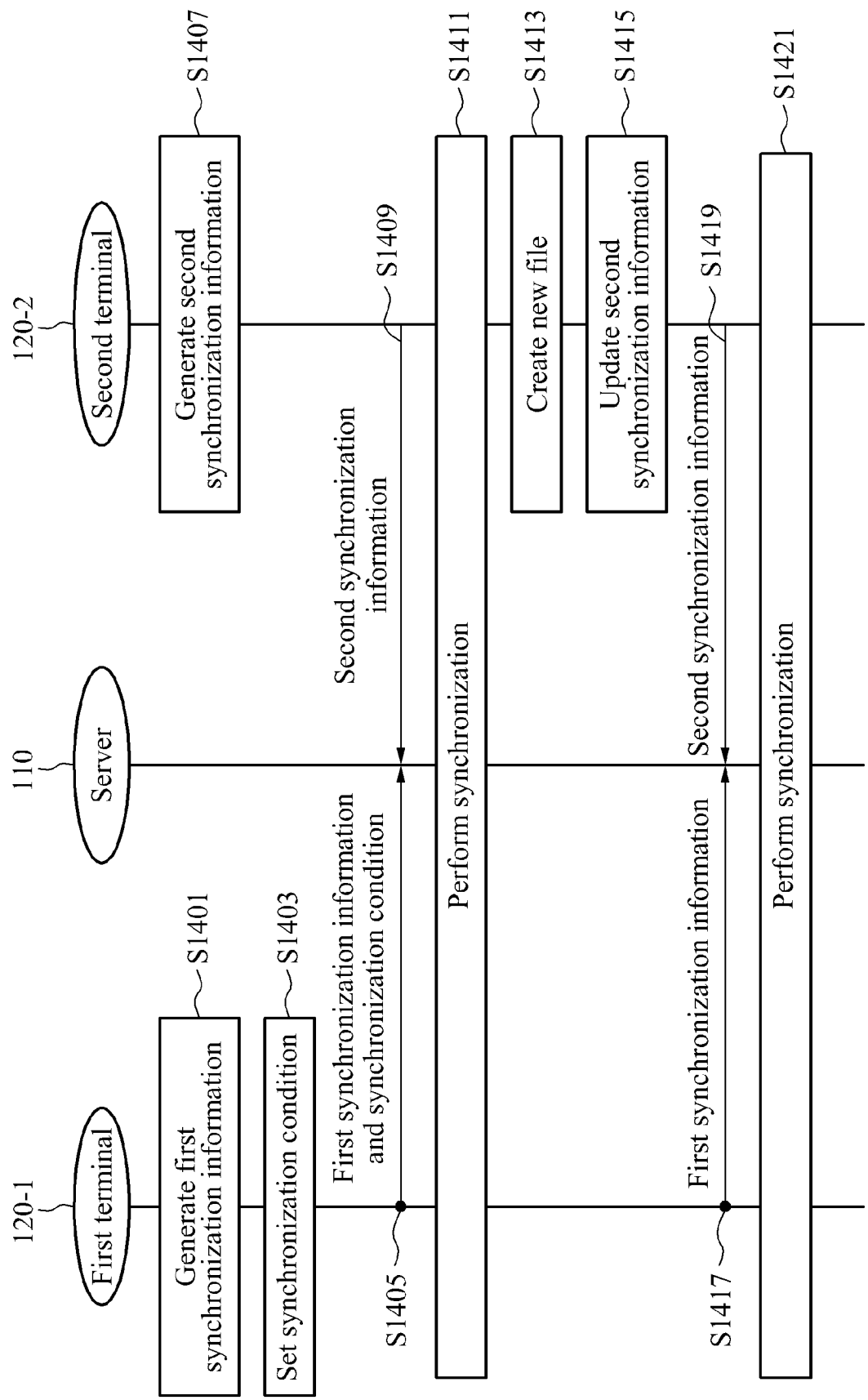
FIG. 14 is a flowchart illustrating a synchronization process between two terminals connected to a server according to an embodiment.

FIG. 14 illustrates a synchronization process between two terminals connected to a server according to an embodiment. In FIG. 14, the server 110 may determine whether synchronization is required.

A first terminal 120-1 may generate first synchronization information in operation S1401, and may set a synchronization condition in operation S1403. The first terminal 120-1 may transmit the first synchronization information and the synchronization condition to the server 110.

A second terminal 120-2 may generate second synchronization information in operation S1407, and may transmit the generated second synchronization information to the server 110 in operation S1409.

The server 110 may compare the first synchronization information and the second synchronization information. The server 110 may determine a target file that is to be synchronized and that meets the synchronization condition, based on the first synchronization information and the second synchronization information. In operation S1411, the server 110 may synchronize the target file. For example, the server 110 may relay the target file.

In operation S1413, the second terminal 120-2 may create a new file. In operation S1415, the second terminal 120-2 may update the second synchronization information. Alternatively, the second terminal 120-2 may determine changed information in the second synchronization information.

In operation S1417, the first terminal 120-1 may periodically or aperiodically transmit the first synchronization information. In an example, the first terminal 120-1 may transmit the first synchronization information, based on a preset period. In another example, when a preset event is detected, the first terminal 120-1 may transmit the first synchronization information. When the first synchronization information is transmitted based on detection of the preset event, operation S1417 may not be performed.

In operation S1419, the second terminal 120-2 may transmit the updated second synchronization information to the server 110. Alternatively, the second terminal 120-2 may transmit only the changed information in the second synchronization information to the server 110.

The server 110 may perform synchronization, based on a comparison result of the received first synchronization information and the received second synchronization information. The server 110 may determine the new file created by the second terminal 120-2 as a target file to be synchronized, based on the comparison result of the first synchronization information and the second synchronization information. Additionally, the server 110 may relay the new file created by the second terminal 120-2 from the second terminal 120-2 to the first terminal 120-1. The first terminal 120-1 may store the new file created and relayed from the second terminal 120-2, and may perform synchronization.

Figure 15:
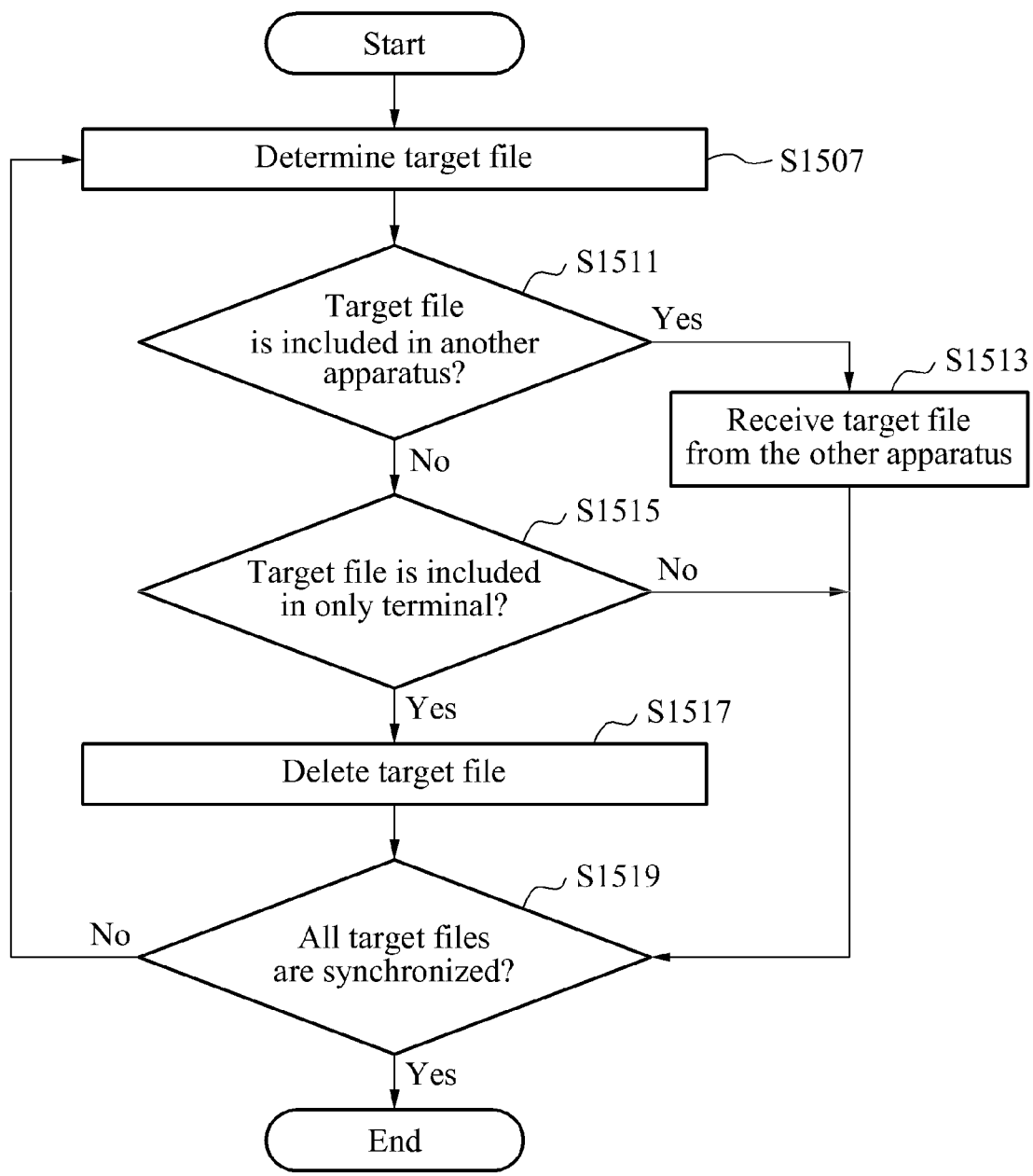
FIG. 15 is a flowchart illustrating a synchronization method according to an embodiment.

FIG. 15 illustrates a synchronization method according to an embodiment.

In operation S1507, the terminal 120 may determine a target file that is to be synchronized, based on a comparison result of first synchronization information for a file included in the terminal 120 and second synchronization information for a file included in the server 110. In operation S1511, the terminal 120 may determine whether the target file is included in another apparatus. When the target file is determined to be included in only the other apparatus, not in the terminal 120, the target file may be received from the other apparatus in operation S1513.

In operation S1515, the terminal 120 may determine whether the target file is included in only the terminal 120. When the target file is determined to be included in only the terminal 120 in operation S1515-Y, the terminal 120 may delete the target file in operation S1517. In the synchronization method of FIG. 15, the second synchronization information may be used for synchronization, however, is merely an example. For example, when the first synchronization information is used for synchronization, the terminal 120 may transmit the target file to the server 110.

In operation S1519, the terminal 120 may determine whether all target files are synchronized. The terminal 120 may repeatedly perform synchronization so that all the target files may be synchronized.

Figure 16:
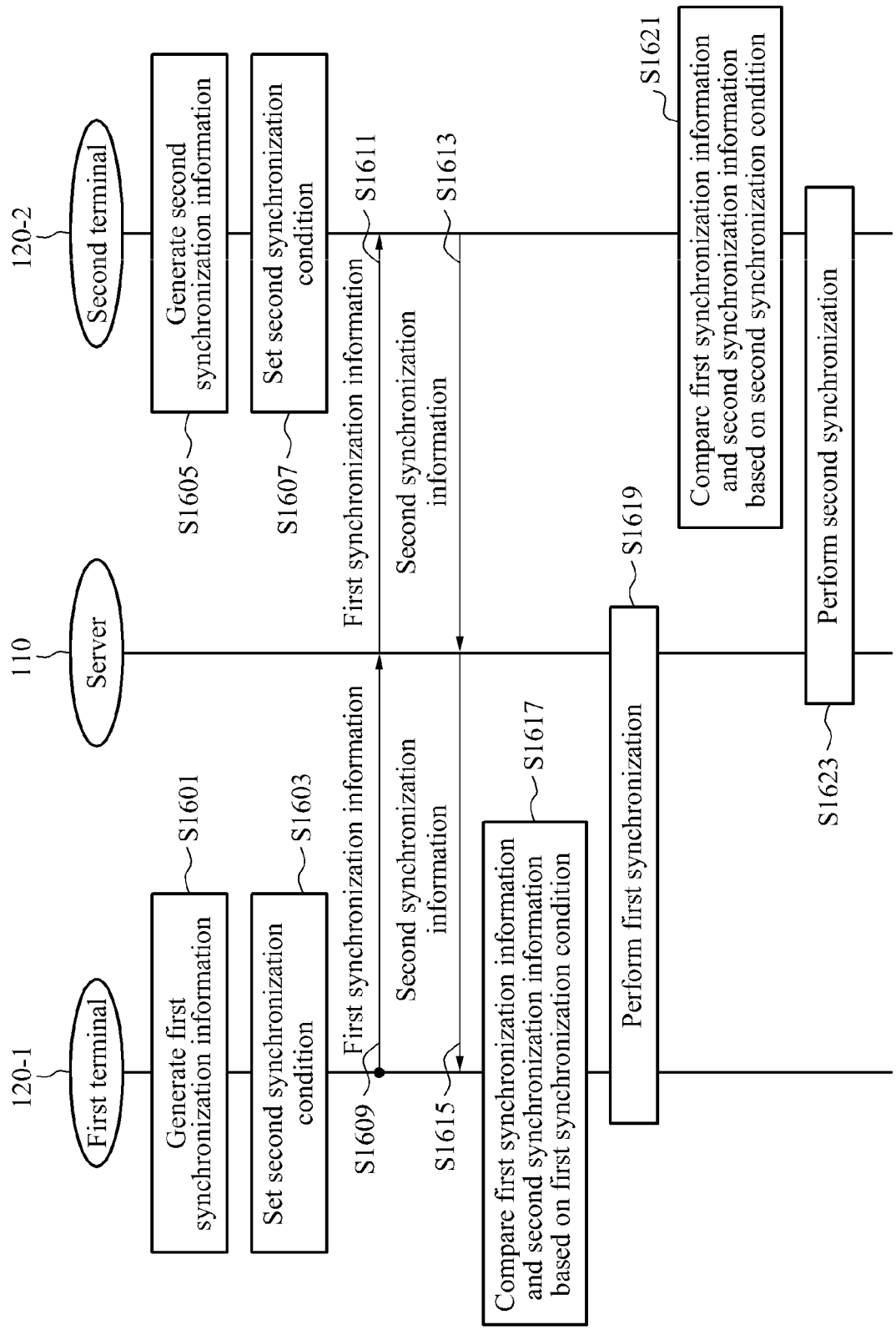
FIG. 16 is a flowchart illustrating an example in which a first terminal and a second terminal have different synchronization conditions according to an embodiment.

FIG. 16 illustrates an example in which a first terminal and a second terminal have different synchronization conditions according to an embodiment.

Referring to FIG. 16, the first terminal 120-1 may generate first synchronization information in operation S1601, and may set a first synchronization condition in operation S1603. The second terminal 120-2 may generate second synchronization information in operation S1605, and may set a second synchronization condition in operation S1607. The second synchronization condition may be different from the first synchronization condition.

In operation S1609, the first terminal 120-1 may transmit the first synchronization information to the server 110. In operation S1611, the second terminal 120-2 may receive the first synchronization information from the server 110. In operation S1613, the second terminal 120-2 may transmit the second synchronization information to the server 110. In operation S1615, the first terminal 120-1 may receive the second synchronization information from the server 110. Alternatively, the first terminal 120-1 and the second terminal 120-2 may transmit and receive the first synchronization information and the second synchronization information using a D2D scheme, without relaying through a server.

In operation S1617, the first terminal 120-1 may compare the first synchronization information and the second synchronization information, based on the first synchronization condition. In operation S1619, the first terminal 120-1 may perform first synchronization, based on a comparison result of the first synchronization information and the second synchronization information under the first synchronization condition.

In operation S1621, the second terminal 120-2 may compare the first synchronization information and the second synchronization information, based on the second synchronization condition. In operation S1623, the second terminal 120-2 may perform second synchronization, based on a comparison result of the first synchronization information and the second synchronization information under the second synchronization condition.

For example, the first terminal 120-1 may set a JPG extension as a synchronization condition, and the second terminal 120-2 may set a doc extension as a synchronization condition. In this example, the first terminal 120-1 may synchronize a JPG file stored in the second terminal 120-2. Additionally, the second terminal 120-2 may synchronize a doc file stored in the first terminal 120-1.

As described above, different synchronization conditions may be set in the first terminal 120-1 and the second terminal 120-2. Additionally, the terminal may create a structure of folders, based on meta information set as a synchronization condition. Accordingly, due to different synchronization conditions in the first terminal 120-1 and the second terminal 120-2, the first terminal 120-1 and the second terminal 120-2 may generate different folder structures.

FIG. 17 illustrates a synchronization process according to an embodiment.

In operation S1701, the terminal 120 may set a synchronization condition. In operation S1703, the terminal 120 may transmit the set synchronization condition to the server 110.

In operation S1705, the terminal 120 may generate first synchronization information including meta information and an identifier of a file meeting the synchronization condition. In operation S1707, the server 110 may generate second synchronization information including meta information and an identifier of a file meeting the synchronization condition. In other words, the synchronization information may include meta information and an identifier of only a file meeting the synchronization condition among at least one file stored in the terminal 120.

Referring to FIG. 18A, the terminal 120 may include information 1000 on all stored files. In an example, the terminal 120 may determine a file extension, for example "JPG," as a synchronization condition. In this example, the terminal 120 may generate synchronization information for only files meeting the synchronization condition, that is, JPG files, as shown in FIG. 18B.

In another example, the terminal 120 may set a file creation time, for example "2013.7.10," as a synchronization condition. In this example, the terminal 120 may generate synchronization information for only files meeting the synchronization condition, that is, files corresponding to "2013.7.10," as shown in FIG. 18C.

Referring back to FIG. 17, in operation S1709, the terminal 120 may receive the second synchronization information. In operation S1711, the terminal 120 may determine whether synchronization is required, by comparing the first synchronization information and the second synchronization information. The terminal 120 may simply compare the first synchronization information and the second synchronization information, regardless of the synchronization condition.

When the synchronization is determined to be required, the server 110 and the terminal 120 may perform the synchronization.

The methods according to the embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A terminal for performing synchronization with a server connected through a network, the terminal comprising:
    at least one processor configured to generate first synchronization information comprising a file identifier and meta information of at least one file and an originating device of the file, stored in the terminal; and
    a transceiver configured to receive, from the server, second synchronization information comprising a file identifier and meta information of at least one file and an originating device of the file, stored in the server,
    wherein the at least one processor is further configured to:
        determine a target file that is to be synchronized by identifying preset synchronization information, and comparing the identified preset synchronization information of the first synchronization information and the second synchronization information, and
        synchronize the determined target file with one of the first synchronization information and the second synchronization information, and
    wherein the synchronized files are stored in at least one folder created automatically according to at least one meta information set as the synchronization condition in the terminal and the server, based on different criteria including at least one of items included in the meta information.

2. The terminal of claim 1, wherein the meta information of the at least one file comprises at least one of a creation time, a change time, location information on a location in which a file is created or changed, terminal information on a terminal that creates or changes a file, user information or content summary information, in association with each of the at least one file.

3. The terminal of claim 1, wherein the at least one processor is further configured to create a folder corresponding to at least one meta information set as the synchronization condition.

4. The terminal of claim 3, wherein the at least one processor is further configured to control the target file to be stored in the created folder.

5. The terminal of claim 1, wherein when a new file is created, the at least one processor is further configured to:
    extract meta information from the new file, and
    generate first synchronization information comprising the extracted meta information.

6. The terminal of claim 1, wherein when a new file is created, the at least one processor is further configured to:
    generate meta information indicating an attribute of the new file, and
    generate first synchronization information comprising the generated meta information.

7. The terminal of claim 1, wherein when a new file is created or when an existing file is changed, the at least one processor is further configured to update the first synchronization information, based on a creation of the new file and a change in the existing file.

8. The terminal of claim 1, further comprising:
an input device configured to receive an input of a synchronization permissible range permitting synchronization of the at least one file,
wherein the at least one processor is further configured to update the first synchronization information, based on the synchronization permissible range.

9. The terminal of claim 1,
wherein the transceiver is further configured to receive changed information associated with a change between updated second synchronization information and original second synchronization information, and
wherein the at least one processor is further configured to determine whether synchronization is required, based on the changed information.

10. The terminal of claim 1, wherein when the target file is included in the server, the at least one processor is further configured to control the transceiver to receive the target file from the server.

11. The terminal of claim 1, wherein when the target file is included in the terminal, the at least one processor is further configured to perform at least one of deleting the target file or controlling the target file to be transmitted.

12. A synchronization method of a terminal for performing synchronization with a server connected through a network, the synchronization method comprising:
generating first synchronization information comprising a file identifier and meta information of at least one file and an originating device of the file, stored in the terminal;
receiving, from the server, second synchronization information comprising a file identifier and meta information of at least one file and an originating device of the file, stored in the server;
determining a target file that is to be synchronized by identifying preset synchronization information, and comparing the identified preset synchronization information of the first synchronization information and the second synchronization information; and
synchronize the determined target file with one of the first synchronization information and the second synchronization information,
wherein the synchronized files are stored in at least one folder created automatically according to at least one meta information set as the synchronization condition in the terminal and the server, based on different criteria including at least on of items included in the meta information.

13. The synchronization method of claim 12, wherein the meta information of the at least one file comprises at least one of a creation time, a change time, location information on a location in which a file is created or changed, terminal information on a terminal that creates or changes a file, user information or content summary information, in association with each of the at least one file.

14. A terminal for performing synchronization with a server connected through a network, the terminal comprising:
at least one processor configured to:
identify one or more file creation dates of at least one file stored in the terminal,
generate a first graphic object corresponding to a first creation date in a user interface and selecting at least one file stored in the terminal corresponding to the first creation date in order to synchronize the at least one file with the server,
control a display of the user interface and selecting a portion of the at least one file corresponding to the first creation date, and
synchronize the selected at least one file corresponding to the first user interface,
wherein synchronization of the target file comprises storing the selected at least one file in a first folder in the terminal, and
wherein the first folder is created based on first creation date.

15. The terminal of claim 14, wherein the at least one processor is further configured to generate a second graphic object corresponding to a second creation date in the user interface and selecting at least one file stored in the terminal corresponding to the second creation date.

16. The terminal of claim 15, wherein the at least one processor is further configured to synchronize the selected at least one file corresponding to the first graphic object and the selected at least one file corresponding to the second graphic object.

17. The terminal of claim 14, wherein the first graphic object is a check box type.

18. The terminal of claim 14, wherein the first creation date and the first graphic object are placed adjacent to each other in the user interface.

19. The terminal of claim 14, wherein the at least one file stored in the terminal is an image file.

20. A method, in a terminal, for performing synchronization with a server connected to the terminal through a network, the method comprising:
identifying one or more file creation dates of at least one file stored in the terminal;
generating a first graphic object corresponding to a first creation date in a user interface and selecting at least one file stored in the terminal corresponding to the first creation date in order to synchronize the at least one file with the server;
controlling a display of the user interface and selecting a portion of the at least one file corresponding to the first creation date; and
synchronizing the selected at least one file corresponding to the first user interface,
wherein synchronization of the target file comprises storing the selected at least one file in a first folder in the terminal, and
wherein the first folder is created based on first creation date.

21. The method of claim 20, further comprising generating a second graphic object corresponding to a second creation date in the user interface and selecting at least one file corresponding to the second creation date of at least one file stored in the terminal.

22. The method of claim 21, further comprising synchronizing the selected at least one file corresponding to the first graphic object and the selected at least one file corresponding to the second graphic object.

23. The method of claim 20, wherein the first creation date and the first graphic object are displayed adjacent to each other in the user interface.

24. The method of claim 20, wherein the at least one file stored in the terminal is an image file.

* * * * *